US011533387B2

(12) United States Patent
Wyatt et al.

(10) Patent No.: US 11,533,387 B2
(45) Date of Patent: Dec. 20, 2022

(54) INTERFACE ENGINE ARCHITECTURE

(71) Applicant: CERNER INNOVATION, INC., Kansas City, KS (US)

(72) Inventors: Jesse Daniel Wyatt, Kansas City, KS (US); Peter Teunissen, Phoenixville, PA (US); Nigel Timothy Meachen, Kansas City, KS (US); Girish Chawla, Collegeville, PA (US); Jerald Greg Mahurin, Lee's Summit, MO (US); Craig S. Robinson, Downingtown, PA (US); Olga Monastyrskaya, King of Prussia, PA (US); Rajneesh Mehra, Overland Park, KS (US); Steven Allen Fine, Kansas City, KS (US); Puthenveettil Basheer Nias, Chester Springs, PA (US)

(73) Assignee: CERNER INNOVATION, INC., North Kansas City, MO (US)

( * ) Notice: Subject to any disclaimer, the term of this patent is extended or adjusted under 35 U.S.C. 154(b) by 170 days.

(21) Appl. No.: 16/405,017

(22) Filed: May 7, 2019

(65) Prior Publication Data
US 2020/0177710 A1 Jun. 4, 2020

Related U.S. Application Data

(60) Provisional application No. 62/773,316, filed on Nov. 30, 2018.

(51) Int. Cl.
*H04L 69/18* (2022.01)
*G06F 9/451* (2018.01)
*G06F 9/54* (2006.01)
(52) U.S. Cl.
CPC .............. *H04L 69/18* (2013.01); *G06F 9/451* (2018.02); *G06F 9/546* (2013.01)

(58) Field of Classification Search
CPC ........... H04L 69/18; G06F 9/451; G06F 9/546
See application file for complete search history.

(56) References Cited

U.S. PATENT DOCUMENTS 6,101,556 A * 8/2000 Piskiel .................... H04L 29/06
719/313
6,334,158 B1 * 12/2001 Jennyc ...................... G06F 8/20
713/1

(Continued)

FOREIGN PATENT DOCUMENTS

WO WO 0049481 * 8/2000
WO WO 0147207 * 12/2007

OTHER PUBLICATIONS

"Cloud Computing—What Auditors need to know," Presentation, Deloitte Development LLC, 2014, 46 pages.

(Continued)

*Primary Examiner* — Lance Leonard Barry
*Assistant Examiner* — Timothy J Sowa
(74) *Attorney, Agent, or Firm* — Shook, Hardy & Bacon L.L.P.

(57) ABSTRACT

Embodiments herein disclose an interface engine architecture. The interface engine architecture includes Java services and any combination thereof an adapter and/or a gateway, in embodiments. The interface engine architecture may be configured through a cloud-based application programming interface that provide a user-interactive graphical user interface, using templates for interface templates. The interface templates may be automatically populated with programming blocks that reflect protocol(s) of one or more message sources and/or one or more message destination(s). Once populated, messages received from one or more sources may be transformed using the programming blocks in the template and communicated to one or more destinations.

17 Claims, 21 Drawing Sheets

(56) References Cited

U.S. PATENT DOCUMENTS

| | | | | |
|---|---|---|---|---|
| 8,543,939 | B2* | 9/2013 | Owen | G06F 40/151 |
| | | | | 715/787 |
| 10,506,061 | B1* | 12/2019 | Lazzaro | H04L 67/568 |
| 2004/0187095 | A1* | 9/2004 | Gilfix | H04L 69/18 |
| | | | | 717/120 |
| 2004/0205136 | A1* | 10/2004 | Whittenberger | G06Q 10/10 |
| | | | | 709/206 |
| 2005/0010689 | A1* | 1/2005 | Henry | G06F 9/451 |
| | | | | 709/246 |
| 2006/0077895 | A1* | 4/2006 | Wright | H04L 61/251 |
| | | | | 370/235 |
| 2006/0106941 | A1* | 5/2006 | Singhal | H04L 67/2823 |
| | | | | 709/238 |
| 2006/0265689 | A1* | 11/2006 | Kuznetsov | G06F 9/546 |
| | | | | 717/117 |
| 2007/0174398 | A1* | 7/2007 | Addante | H04L 51/14 |
| | | | | 709/206 |
| 2007/0214419 | A1* | 9/2007 | Jain | H04L 67/36 |
| | | | | 715/736 |
| 2009/0234844 | A1* | 9/2009 | Kaehler | G06F 9/546 |
| 2011/0029681 | A1* | 2/2011 | Lee | H04L 69/08 |
| | | | | 709/230 |
| 2013/0151570 | A1* | 6/2013 | Sandoval | G06Q 30/02 |
| | | | | 707/803 |
| 2014/0325009 | A1* | 10/2014 | Hood | H04L 67/12 |
| | | | | 709/206 |
| 2015/0381514 | A1* | 12/2015 | Word | H04L 47/6295 |
| | | | | 709/203 |
| 2016/0285698 | A1* | 9/2016 | Ritter | G06Q 10/00 |
| 2019/0044899 | A1* | 2/2019 | Hughes | G06Q 40/08 |
| 2019/0102761 | A1* | 4/2019 | Pan | H04L 69/08 |
| 2019/0124141 | A1* | 4/2019 | Waltz | G06F 16/27 |

OTHER PUBLICATIONS

Galen Healthcare Solutions, "Healthcare Interface Engine Market, Galen Public Webcast: Orion Rhapsody 101," 25 pages, Mar. 5, 2015, Boston, Massachusetts, retrieved from Internet Archive Wayback Machine <https://web.archive.org/web/20150501000000*/https://wiki.galenhealthcare.com/images/2/26/Orion_Rhapsody_101.pdf> on Aug. 7, 2019.

Wittrock, Morten, "Cloud Integration mapping: Your options explained and compared," Web page <https://blogs.sap.com/2018/06/18/cloud-integration-mapping-your-options-explained-and-compared/>, 19 pages, Jun. 18, 2018.

Deshpande, Deepak G., "SAP Cloud Platform Integration—Message Mapping Display Queue," Web page <https://blogs.sap.com/2018/06/22/sap-cloud-platform-integration-message-mapping-display-queue/>, 12 pages, Jun. 22, 2018.

* cited by examiner

300

CONTINUED FROM 3A

370
TRANSFORM THE PLURALITY OF MESSAGES FROM THE FIRST PROTOCOL AND THE SECOND PROTOCOL TO THE THIRD PROTOCOL USING THE TEMPLATE COMPRISING THE FIRST, SECOND, AND THIRD PROGRAMMING BLOCKS, WHEREIN INFORMATION ENCODED IN THE PLURALITY OF MESSAGES IS CONSERVED AS ENCODED IN THE TRANSFORMED MESSAGE USING THE THIRD PROTOCOL

380
COMMUNICATE THE TRANSFORMED MESSAGE TO THE MESSAGE DESTINATION

INTERFACE ENGINE ARCHITECTURE

CROSS-REFERENCE

This application is a non-provisional application that claims the benefit of and priority to the provisional U.S. App. No. 62/773,316, filed on 30 Nov. 2018 and entitled "Interface Engine Architecture," which is incorporated herein by reference in its entirety.

BACKGROUND

Prior technologies for building and testing an integration engine relied on assigning a reference to each object (i.e., aliasing) and writing custom script for each possible scenario, and further, for each object within each possible scenario.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

In brief and at a high level, this disclosure describes, among other things, methods, systems, and computer-readable media for generating a GUI, wherein the GUI provides templates and reusable programming blocks for building an interface to transform interface messages, and the GUI constructs a datafile to encode the specialized interface template built through the GUI.

A computerized method is provided in an embodiment of the present invention. The method comprises providing a template for message transformation, wherein providing the template causes the template to be displayed in a GUI. When a message is obtained from a source, the method determines whether the message utilizes a first protocol that is associated with the source, the first protocol defining a structure of the message. When an indication of a message destination is obtained via the GUI, the method determines whether a message destination utilizes a second protocol, the second protocol defining a structure that is different from the first protocol. In accordance with the method, the template for message transformation is automatically populated with a first programming block for the first protocol and a second programming block for the second protocol in response to determining that the message utilizes the first protocol and determining that the message destination utilizes the second protocol. The method further comprises transforming the message from the first protocol to the second protocol using the template comprising the first and second programming blocks, wherein information encoded in the message using the first protocol is conserved as encoded in the transformed message using the second protocol. The method then communicates the transformed message(s) to the message destination(s).

Another embodiment provides one or more non-transitory computer-readable media having computer-executable instructions embodied thereon that, when executed, perform a method. The method comprises providing a template for message transformation, wherein providing the template causes the template to be displayed in a GUI. The method obtains a message from a source, and in response to obtaining the message from the source, determines that the message utilizes a first protocol that is associated with the source, the first protocol defining a structure of the message. An indication of message destinations is obtained via the GUI, and in response to obtaining the indication of message destinations, the method determines that the message destinations utilize a second protocol and a third protocol, each of the second protocol and the third protocol defining a structure that is different from the first protocol. The method continues by automatically populating the template for message transformation with a first programming block for the first protocol, a second programming block for the second protocol, and a third programming block for the third protocol, in response to determining that the message utilizes the first protocol and determining that the message destinations utilize the second protocol and the third protocol. In accordance with the method, the message is transformed from the first protocol to the second protocol using the template comprising the first and second programming blocks, wherein information encoded in the message using the first protocol is conserved as encoded in the transformed message using the second protocol. Additionally, the message is transformed from the first protocol to the third protocol using the template comprising the first and third programming blocks, wherein information encoded in the message using the first protocol is conserved as encoded in the transformed message using the third protocol. The method then communicates the transformed message(s) to each of the message destinations.

Yet another embodiment provides one or more non-transitory computer-readable media having computer-executable instructions embodied thereon that, when executed, perform a method. In accordance with the media, the method performed comprises providing a template for message transformation, wherein providing the template causes the template to be displayed in a GUI. The method obtains a plurality of messages from a source. The method determines when the plurality of messages utilizes a first protocol and a second protocol, the first protocol defining a structure of a first portion of the plurality of messages and the second protocol defining a different structure of a second portion of the plurality of messages. The method obtains an indication of one message destination via the GUI. The method then determines that the one message destination utilizes a third protocol, the third protocol defining a structure that is different from the first protocol and the second protocol. In accordance with the method, the template for message transformation is automatically populated with a first programming block for the first protocol, a second programming block for the second protocol, and a third programming block for the third protocol, in response to determining that the plurality of messages utilize the first and second protocols and determining that the one message destination utilizes the third protocol. The method then transforms the plurality of messages to the third protocol using the template comprising the first, second, and third programming blocks, wherein information encoded in the plurality of messages using the first and second protocols is conserved as encoded in the transformed message using the third protocol. The method further comprises communicating the transformed message to the message destination.

BRIEF DESCRIPTION OF THE DRAWINGS

Embodiments are described in detail below with reference to the attached drawings figures, wherein:

FIGS. 3A-3B depict a flow diagram of an exemplary method in accordance with an embodiment of the present invention;

FIG. 13 depicts an exemplary GUI in accordance with embodiments of the present invention;

FIG. 15 depicts an exemplary GUI in accordance with embodiments of the present invention;

FIG. 16 depicts an exemplary GUI in accordance with embodiments of the present invention;

FIG. 17 depicts an exemplary GUI in accordance with embodiments of the present invention;

FIG. 18 depicts an exemplary GUI in accordance with embodiments of the present invention.

DETAILED DESCRIPTION

Figure 1:
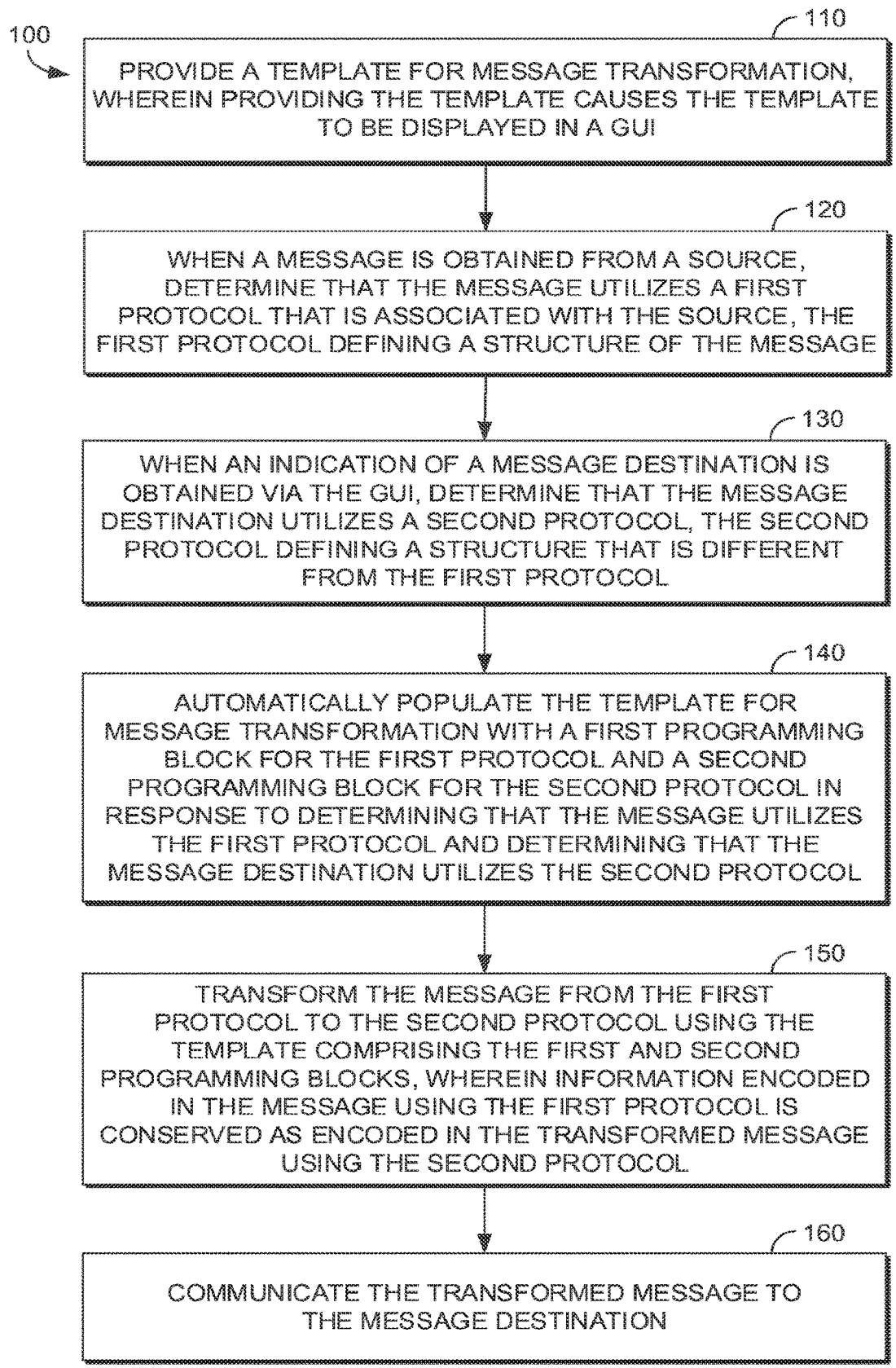
FIG. 1 is a flow diagram of an exemplary method in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. It will also be understood from this enabling description that the present invention is applicable to other environments and applications, beyond healthcare. As such, the present invention herein is not limited to healthcare applications and other environments and applications are contemplated and considered to be within the scope of this disclosure.

Embodiments of the invention provide technological improvements that address technological problems specifically arising from computer-based integration engine technology, which use interfaces and interface message to communicatively link incompatible computer systems and/or computer networks, for example. As understood by a person having skill in that art, and in view of this Detailed Description, computer-based integration engines are inherently specific to computer technology and exist only in the realm of computer technology (i.e., computer integration engines do not involve organizing human activity and there is no non-technological counterpart for computer integration engines). As used herein, the terms "interface engine" and "integration engine" are used interchangeably. Also, the terms "interface message," "transaction message," "transaction," and "message" are used interchangeably hereinafter.

Embodiments described herein generate a GUI through which a customized interface may be built and used to transform interface messages traveling through a computer integration engine, for example. The GUI provides templates and a toolset of reusable programming blocks for building an interface to transform interface messages, for example, as employed in a computer-based integration engine. First, the embodiments discussed herein eliminate "alias building" or "aliasing." Alias building is a process by which a defined data object having an initially-defined identifier is provided an additional, alternative identifier by using computer programming instructions to define the alternative identifier as being equivalent to the initially-defined identifier (i.e., aliases are equated to one another). By using the GUI that provides templates and reusable programming blocks for building an interface to transform interface messages, alias building may be eliminated. As such, the embodiments herein provide a technological improvement.

The templates and a toolset of reusable programming blocks manipulated through the GUI also overcome technological limitations. In accordance with the invention, populating a template with one or more of the reusable programming blocks creates a customized interface, and that customized interface (e.g., programming blocks) is then used to perform complex mapping and transformations of interface messages traveling through an integration engine. The transformed message(s) exhibit a content type, a structure of content, and a message type defined by the programming blocks in the customized template, such that the transformed message(s) conforms to one or more protocols associated with a message destination. As such, the message destination is capable of recognizing, understanding, and consuming the transformed message(s). In contrast, for example, the message destination would not be capable of recognizing, understanding, and consuming the untransformed message(s).

In embodiment, the GUI and the customized interface that is built by populating a template with specific programming blocks from the toolset are storable in the form of a reusable datafile. Because the datafile is reusable, embodiments described herein may be re-used any number of times to transform a multitude of interface messages traveling between incompatible computer systems and/or system networks. To be more specific, for example, a customized interface for handling interfaces between two systems using different protocols can be reused between other systems, when those other systems involve the same protocols at issue. As such, the embodiments overcome technological limitations by eliminating the cumbersome development of composing computer programming script for every single different iteration of interface message transformation (e.g., a separate script would be composed for each and every different protocol-to-protocol combination), for example, which amounted to innumerable iterations and redundant script. In contrast to piecemeal scripting, the templates and reusable programming blocks are used to build, test, and deploy new customized interfaces for integration engines, generally speaking. For example, a template populated with reusable programming may be used to transform interface messages (e.g., HL7 interface messages, such ADT, ORC (common order), OBX (observation/results), Charges Out, Charges, and Schedules In) and create interoperability through the integration engine. As used herein, the terms "interface engine" and "integration engine" are used interchangeably. Because the embodiments described herein eliminate the need to write custom script for each set of interface messages, the embodiments overcome the limitation of prior technologies and provide an improvement over prior technologies.

Additionally, as will be understood upon reading this Detailed Description, the embodiments described herein address technological problems that specifically arise from computer-based integration engine technology. Further, computer-based integration engines are inherently specific to computer technology and exist only in the realm of computer technology (i.e., computer integration engines do not involve organizing human activity and there is no non-technological counterpart for computer integration engines).

Interface Configuration

Beginning with FIG. 1, a flow diagram of an exemplary method 100 is depicted in accordance with an embodiment of the present invention. In embodiments, the method 100 is performed by execution of computer-executable instructions embodied on one or more non-transitory computer-readable media. The method 100 may be performed using the exemplary environments described hereinafter, in embodiments. In some embodiments, the method 100 may be performed in order to generate a datafile that is usable for interface message mapping between an interface message source and an interface message endpoint (e.g., between two or more non-interoperable compute systems and/or networks), wherein the datafile encodes a graphical user interface (GUI) having the customized template that has been populated with programming blocks as built through the method 100. The method 100 may be performed by accessing the GUI via a cloud-based application program interface (API) that generates the GUI, in one embodiments.

Generally, the method 100 generates a template and autopopulates the template with re-usable programming blocks that are able to transform an input interface message from one protocol to one or more different protocols, all while ensuring that the data content of the input interface message is conserved in the output interface message(s) derived from the input interface message through the transformative template, for example. As used herein, data content refers to information encoded in the data that is intended to be exchanged or otherwise passed from one system to another, independent of protocol or message type.

In embodiments, the method 100 provides a template for message transformation, shown at block 110. Generally, the template is displayed in GUI. This initial template may be preconfigured to include one or more programming blocks. In one example, the initial template may be preconfigured to include one or more programming blocks that act as a placeholder into which a user input is used to identify and/or specify a particular source. For example, a programming block may be a "fillable." Alternatively, a programming block may preconfigured with instructions that are specific to the template loaded into the GUI. In some instances, a programming block may preconfigured with instructions that are specific to the template loaded into the GUI, when that template is specifically configured to receive interface message having a particular protocol. Additionally or alternatively, one or more of the programming blocks act as a placeholder into which a user input is used to identify and/or specify a particular endpoint or destination for interface messages. In some instances, a programming block may preconfigured with instructions that are specific to the template loaded into the GUI when that template is specifically configured to produce and/or output transformed interface message to have a particular protocol. In an embodiment, an initial template loaded into the GUI may be preconfigured with one or more programming blocks that are usable to transform an input interface message or input object into an output HTTP HL7-type interface message for communication to any number of endpoints or computerized destination systems. In another embodiment, one of the preconfigured programming blocks in the template may be a placeholder into which a source designation may be placed, where the source is anticipated to provide input interface messages using an HTTP HL7 protocol. In embodiments, one or more preconfigured programming blocks acting as fillable placeholders are further configured to receive parameters or detailed configurations, and as such, parameters and specific configurations for transformation may be added to a particular programming block, for example. In some embodiments, one or more templates are prebuilt and are stored in a datastore, which acts as a template library or a repository of retrievable templates. In such an embodiment, the datastore stores a plurality of templates and a plurality of programming blocks. Generally, an individual template may comprise one programming block or many programming blocks. Further, the template and each of the programming blocks comprise metadata.

Each individual template defines one or more destinations to which a message may be communicated, in embodiments. For example, the initial preconfigured template may be a skeletonized programming outline or framework for transforming an interface message input in one protocol to any destination that uses a second, different protocol. By including only those programming blocks that are believed to be necessary to the transformation, the template is an outline of is "skeletonized" as initially loaded into the GUI, for example. In another example, the initial preconfigured template is a programming outline or framework for transforming an input HL7-type message to a second protocol used by one destination and transforming the same message into a third protocol for yet another destination (e.g., the template may include a programming block that duplicates an input message). Generally, each initial template includes programming blocks that define structural requirements of an anticipated destination's associated protocol, in various embodiments. As used herein, "structural requirements" is intended to encompass the structure of the message that the anticipated destination is able to recognize or otherwise expects, and the term should not be construed as a strict requirement. For example, an initial template for transforming an input HL7-type message to be communicated to a destination that uses a second protocol may include only those programming blocks that define structural requirements of the second protocol. Without the structural requirements of the second protocol being met, the destination using the second protocol is unable to recognize and use the data content encoded in a message that lacks the structural requirements of the second protocol. As such, the template provides a framework that is further populated in building the desired interface to handle message transformation between one or more message sources and one or more message destinations.

In further embodiments, one or more of the templates stored in the datastore are preconfigured with one or more programming blocks that define a transport level protocol. The transport level protocol underlies and supports an application level protocol, generally. Additionally or alternatively, one or more of the templates stored in the datastore are preconfigured with one or more programming blocks that define a security protocol, wherein the security protocol operates orthogonally between different levels. It will be understood that the levels discussed herein generally refers to the seven layers or "levels" of the Open System Interconnect (OSI) model, as found in a Messaging Infrastructure Layer. The Messaging Infrastructure Layer model generally includes Layer 5 (session level), Layer 6 (presentation level), and Layer 7 (application level) of the OSI model. In contrast, the transport level generally refers Layers 1 through 4 of the OSI model. At a high level, an application level protocol is specific to a source or a destination. In contrast, a transport level protocol is less specific to a source or a destination, relative to an application level protocol.

Continuing, one or more interface messages are obtained, retrieved, or received from a source, in accordance with the method 100. In one embodiment, one or more interface messages are received from one source. In another embodiment, a plurality of interface messages are received from a plurality of sources. As used herein, a source refers to an endpoint that is associated with an entity from which the messages are received or imported. The entity may be a computerized system or subsystem. An exemplary computerized system is an electronic health record (EHR) system, an immunization records system, or a combination thereof. In some embodiments, the one or more interface messages received are Millennium™ objects. In another embodiment, the one or more received interface messages are Health Level 7 (HL7) type of interface message.

Continuing, the method 100 identifies a specific protocol that is associated with the interface message received. When a message is obtained from a source, the method 100 determines that the message utilizes a first protocol that is associated with the source, as shown at block 120. The first protocol defines a structure of the interface message obtained from the source, for example. Exemplary protocols include OSI application level protocols. OSI application level protocols include Health Level 7 (HL7) protocol and Hypertext Transfer Protocol (HTTP), for example. Generally, the protocols discussed in accordance with the method 100 are application-level protocols, as opposed to a transport-level protocols, for example. The one or more interface messages obtained from a source may share one protocol (i.e., all of the messages are the same message type), or alternatively the one or more interface messages obtained from a source may be associated with multiple distinct protocols. It is noted that, in one embodiment, the template may be provided via the GUI prior to obtaining the interface message from the source. Alternatively, the template may be provided via the GUI subsequent to obtaining the interface message from the source, in some embodiments. In such an example, the method 100 may select a particular template from the library of prebuilt templates when the particular template linked to the first protocol that is determined from the messages obtained from the source.

One exemplary message protocol is the Health Level Seven International (HL7) protocol. HL7 is an electronic data messaging protocol that is leveraged to enable messaging between applications across computerized systems in order to promote interoperability between computerized systems and the exchange of information. Generally, HL7 messages encode electronic data using the American Standard Code for Information Interchange (ASCII). An HL7 message comprises segments of related information. Each segment is labeled or identified with a header. Exemplary segment headers include MSH (i.e., a message header that conveys the metadata of the HL7 message), PID (i.e., patient identification), NK1 (i.e., next of kin), PV1 (i.e., patient visit), SCH (i.e., scheduling activity information), OBR (i.e., observation request), and/or OBXI (i.e., observation result). Each segment is generally independent of the other segments in an HL7 message. Segments may be required, optional, repeatable, or optional and repeatable, depending on the type of HL7 message. For example, within one message, the MSH segment and the PID segment may be required whereas the PD1, PV1, and DRG segments may be optional. The order of segments in each HL7 message may vary depending on the type of HL7 message. Segments are separated by carriage returns (e.g., <cr>, \r, or \x0D), generally.

Each segment is divided into fields, and fields are usually separated by one or more vertical bars, known as a pipe character ("|"). The terms "field" and "composite" are used interchangeability herein. A segment may include any number and type of field for information relating to that segment. Each field has a position in the segment. For example, in a PID segment having three fields, the three fields would be identified "PID one," "PID two," and "PID three," wherein one, two, and three refer to a field's placement relative to other fields in the PID segment when read in the code from left to right. A PID segment, for example, may include a name field, a date of birth field, and/or an address field, each field storing values that are specific to a particular patient associated with an HL7 message. A field may be repeated within a segment, to provide multiple values for the field. For example, an address field may be repeated within a segment to store data for two different addresses associated with the patient being identified in the PID segment (e.g., a tilde character ("~") is placed between two different values to indicate that a field is being repeated). Each field contains values to encode information as data for the segment. Information is encoded as data using, generally, alphanumerical values in each field.

Fields may comprise components. The terms "component" and "sub-composite" are used interchangeably herein. For example, a name field may include a first name component (e.g., component values being "JOHN") and a surname component (e.g., component values being "DOE"). In such an example, the field values would be "JOHN DOE." Any number of components may be included as related to the field. Field components may comprise subcomponents. The terms "subcomponent" and "sub-sub-composite" are used interchangeably herein. For example, a name field may include a surname component and the surname component may include a suffix subcomponent (e.g., subcomponent values being "SR"), and/or a prefix subcomponent (e.g., values "MR"). Components and/or subcomponents may be separated in the encoded data using one or more accent characters ("^"), for example. Any number of subcomponents storing data related to a field component may be included in the field component. As such, as the number of subcomponents, field components, and fields encoding data in an HL7 message increases, the more information is encoded in the HL7 message.

Importantly, it will be understood from this disclosure that embodiments of the present invention may be implemented with regard to HL7 interface messages and non-HL7 interface messages. Thus, the embodiments are not dependent on, and are not limited to, use with any particular protocol or type of message.

Continuing with the method 100, the method 100 includes receiving an indication of the one or more message destinations. A destination refers to an endpoint to which a transformed message is to be communicated. The indication may correspond to an entity-identifying block (e.g., stored in a datastore) being dragged-and-dropped into one of the preconfigured programming blocks of the initial template. The entity-identifying block may include information and metadata regarding the protocol associated with the identified entity that is being designated as a destination. In embodiments, the method 100 receives the indication of the one or more destinations via the GUI, where the indication represents one or more user selections of one or more graphic objects in the GUI. For example, the one or more graphic objects represent the one or more destinations for insertion into the template, via the GUI. Exemplary destination include an Immunization Registry, Electronic Health Records, and computerized systems using the International Health Exchange. However, it is noted that a single system may include a plurality of destinations. For example, one system may include several distinct destinations, each destination using a different application level protocol.

When an indication of a message destination is obtained via the GUI, the method 100 determines that the message destination utilizes a second protocol, as illustrated at block 130. The second protocol defines a structure that is different from the first protocol, in embodiments. Alternatively, in an embodiment where the first and second protocols are the same, communications between the source and an endpoint are immediately operational. In embodiments, the method 100 determines whether the first protocol and the second protocol are the same or similar. The method 100 may determine whether the first protocol and the second protocol are interchangeable such that messages are interoperable between a source using the first protocol and a destination using the second protocol, in embodiments. In an embodiment, the method 100 may determine whether the first protocol and the second protocol are not interchangeable or are not interoperable. In such embodiments, the message obtained from the source is to be transformed, via the template, before communicating the transformed message to the message destination.

The method 100 automatically populates the template for message transformation with a first programming block for the first protocol and a second programming block for the second protocol, as illustrated at block 140, in response to determining that the message utilizes the first protocol and determining that the message destination utilizes the second protocol, respectively. Generally, programming blocks are chosen for populating the template based on the programming blocks' relevance to a message type, a source-associated protocol, an endpoint-associated protocol, or the combination thereof. Programming blocks define destination protocol(s), application protocol(s), and/or security credentials, generally.

In one embodiment, the method 100 automatically selects the first programming block in response to determining that the message utilizes the first protocol, wherein the first programming block is inserted into the template to populate the template and is displayed via the GUI. Additionally, the first programming block comprises identifiers for labeling one or more structures in the message obtained from the source, in embodiments. For example, the identifiers may comprise segment headers, each segment headers corresponding to a particular structure in the message. Identifiers may be used to identify and label fields, components, and/or subcomponent structures within a message. Generally, the structure of a message is defined by or controlled by the first protocol, and as such, the message structure conforms to the first protocol. For example, the sequence of specific fields occurring within a message may be defined by and controlled by a first protocol. In another example, the use of alphanumeric and/or non-alphanumeric values occurring within a message may be defined by and controlled by a first protocol. In yet another example, the character length of a message as whole, a character length of each structure, and/or a character length of a particular structures within the message may be defined by and controlled by a first protocol.

In embodiments, the method 100 automatically selects the second programming block in response to determining that the second protocol is associated with the one or more message destinations. The second programming block is inserted into the template to populate the template and is displayed via the GUI, in such an embodiment. The second programming block recognizes identifiers labeling the one or more structures defined by the first protocol, in some embodiments, as well as one or more structures defined by the second protocol for replacing the one or more structures defined by the first protocol. For example, the second programming block may identify one or more second protocol message structures to be substituted for first protocol message structures. In another example, the second programming block may identify one or more first protocol messages structures to be rearranged and/or removed, in order to comply with and conform to the second protocol. To illustrate, the second programming block may be used to identify that the sequence of the fields FIRST NAME followed by LAST NAME in the input message should be re-sequenced to the order of LAST NAME before FIRST NAME in order to conform to or with the second protocol. Although the term "replacing" is used herein, it should be understood from this disclosure that the second programming block's replacement structures may include structures that duplicate information, rearrange information, delete information, add information, or a combination thereof (relative to initial structure(s) of the message under the first protocol). Additionally or alternatively, the second programming block's replacement structures may include structures that add syntax, modify existing syntax, reorder structures' sequence in the message, add a header, delete a header, modify an existing header, add an envelope, delete an envelope, modify an existing envelope, or a combination thereof. Exemplary structures include message envelopes, wrappers, headers, security headers, and other data structures. In further embodiments, exemplary structures include structures used to encapsulate data in HTTP.

In some embodiments, one or more of the first and second programming blocks may be optionally activated or deactivated in the template. When activated in the template, a programming block is usable for message transformation. When inactivated in the template, a programming block is not usable for message transformation. In an embodiment, the method 100 comprises detecting, via user-interaction with the GUI, an activation of a non-active programming block in the template, wherein the programming block that is activated is used when mapping the message using the populated template. Additionally or alternatively, the method 100 may detect, via user-interaction with the GUI, a deactivation of an active programming block in the template, wherein the programming block that is deactivated is omitted when mapping the message using the populated template. For example, a user input comprising a click may toggle a programming block between active and inactive states, the GUI providing visual changes to the appearance of the displayed programming block to indicate the active or inactive state of said block. However, some programming blocks may not be optionally deactivated. For example, a protocol associated with a message destination may require an envelope for the structure of a message to comply with the protocol of the message destination. In such an example, a programming block that encodes the envelope for the message to be output during transformation may not be deactivated within the template.

In further embodiments, a user may add programming blocks from a datastore that stores a plurality of programming blocks, using the GUI that provides programming blocks for selection. The programming blocks may be reusable within the template. For example, although a protocol associated with a message destination does not require a security structure in a message, a user may selectively populate the template with a programming block that adds a security structure to the message. Additionally or alternatively, a user may input and/or define parameters to one or more of the programming blocks, using the GUI that provides programming blocks. For example, a user may enter a URL into a programming block wherein the URL specifies an endpoint to be contacted or queried during message transformation. Through the autopopulation of the template with programming blocks and/or any user input such as parameterization of programming blocks, the template is tailored to build a specialized interface that is able to transform interface messages passing from a source to a destination, when the source and destination use different interface message protocols. Accordingly, an initial preconfigured template for transforming an HL7-type communication to N number of endpoints becomes a specialized template able to transform an ADT HL7 message (e.g., first protocol) from a source to a non-HL7 message (e.g., a second and different protocol) for receipt by a destination Immunization Registry. In this example, the template may be autopopulated with a programming block that adds a Simple Object Access Protocol (SOAP) wrapper during transformation because the protocol used by the destination Immunization Registry requires a structure of a SOAP wrapper in order for the destination of Immunization Registry to recognize and use the information in the message, for example.

The method 100 continues by transforming the message from the first protocol to the second protocol using the template comprising the first and second programming blocks, as shown in block 110. The information encoded in the message (e.g., data content) using the first protocol is conserved as encoded in the transformed message using the second protocol, in accordance with the method 100. The method 100 communicates the transformed message to the message destination, as shown at block 160. Generally, the transformed message is a new message that is derived from the original message obtained from the source. During transformation, the programming blocks drive the behavior of the interface that is being built by identifying different data content in the message, and determining whether to check a data field in the message for the presence of a particular data point, in embodiments. That data point may result in the programming block querying a registry or datastore before the programming block continues to transform the message, in one such embodiment. For example, a first programming block may be configured to check a specific data field in the message for the presence of data point A or data point B within the specific data field. When the first programming block identifies that the data point A is present in the specific data field, the programming block may pass the message to another programming block, where that sequence of programming blocks is a first path of transformation, for example. In contrast, when the first programming block identifies that the data point B is present in the specific data field, for example, the programming block may pass the message to a different programming block, where that sequence of programming blocks forms a second path of transformation. The template may comprise multiple paths, and multiple forks within each path. In one example, when a programming block identifies that a message includes a PIX identifier (person identifier cross-reference), the programming block is able to pass the message to a next programming block for an International Health Exchange (IHE) endpoint without further processing. In this example, when a programming block identifies that a message from a source lacks a PIX identifier (person identifier cross-reference) because the source does not use a PIX identifier, the programming block may query a PIX registry in order to obtain a PIX identifier for the message. After obtaining the PIX identifier, the programming block may then pass the message to a programming block for an IHE endpoint that uses a protocol for which a PIX identifier structure is required. The template, including the programming blocks and the directions for the paths formed by the programming blocks, are expressed as a datafile which is accessed through the GUI (e.g., as opposed to an executable IF/THEN programming code).

In further embodiments, the method 100 performs a "batch" transformation of many messages. In one such embodiment, the method 100 obtains a plurality of messages from the source and obtains an indication of one message destination via the GUI. Generally, many messages are obtained but only one message destination is designated. In this example, the method 100 may determine that a first portion of the plurality of messages utilizes the first protocol and a second portion of the plurality of messages utilizes a third protocol, wherein the first and third protocols define different structures of the first and second portions of the plurality of messages. As such, the plurality of messages include a variety of different message types, for example. In the example, the method 100 may automatically populate the template with a third programming block for the third protocol, in addition to the first and second programming blocks also populated into the template, as described in the method 100 above. Then, in accordance with the method 100, transforming the plurality of messages includes transforming the first portion of the plurality of messages from the first protocol to the second protocol using the first and second programming blocks, and transforming the second portion of the plurality of messages from the third protocol to the second protocol using the third and second programming blocks, in embodiments. In the example, the plurality of messages are concurrently transformed as a batch.

Once a message is transformed through the template, the transformed message comprises a content type, a structure of content, and a message type that conforms to the protocol of the destination so that the destination is able to recognize, understand, and consume the transformed message, for example.

In another embodiment, the method 100 performs a transformation of one message into a "conversation" with multiple endpoints or destinations. In one such example, the method 100 obtains one message from the source and obtains an indication of a plurality of message destinations via the GUI. The method 100 determines that a first portion of the plurality of message destinations utilizes the second protocol and a second portion of the plurality of message destinations utilizes a third protocol, in such an exemplary embodiment (e.g., a first protocol is associated with the one message from the source). The second and third protocols define different structures of the first and second portions of the plurality of message destinations, for example. Then, the method 100 may automatically populate the template with a third programming block for the third protocol, in addition to the first and second programming blocks populated in the template. In such an embodiment, the method 100 transforms the plurality of messages by duplicating the one message. For example, the one message is copied or "split" into several copies. A programming block may be used to duplicate the whole message or partially duplicate the message. Depending on the protocol associated with the destination, only a portion of the one message might be duplicated, in some embodiments. In this exemplary embodiment, at least one of the duplicated messages is transformed from the first protocol to the second protocol using the first and second programming blocks, and at least one of the duplicated messages is transformed from the first protocol to the third protocol using the first and third programming blocks. In such an embodiment, the method 100 communicates the duplicated messages, as transformed, to the plurality of message destinations. For example, one or more duplicate message(s) transformed to the second protocol are communicated to a destination associated with the second protocol and one or more duplicate message(s) transformed to the third protocol are communicated to a destination associated with the third protocol. Accordingly, messages transformed into a particular protocol are sent to respective destinations that have or use the same protocol.

In embodiments, the GUI that displays the populated template for message transformation also constructs a new datafile. That new datafile encodes the specific populated template. The datafile may then be reused.

Figure 2A:
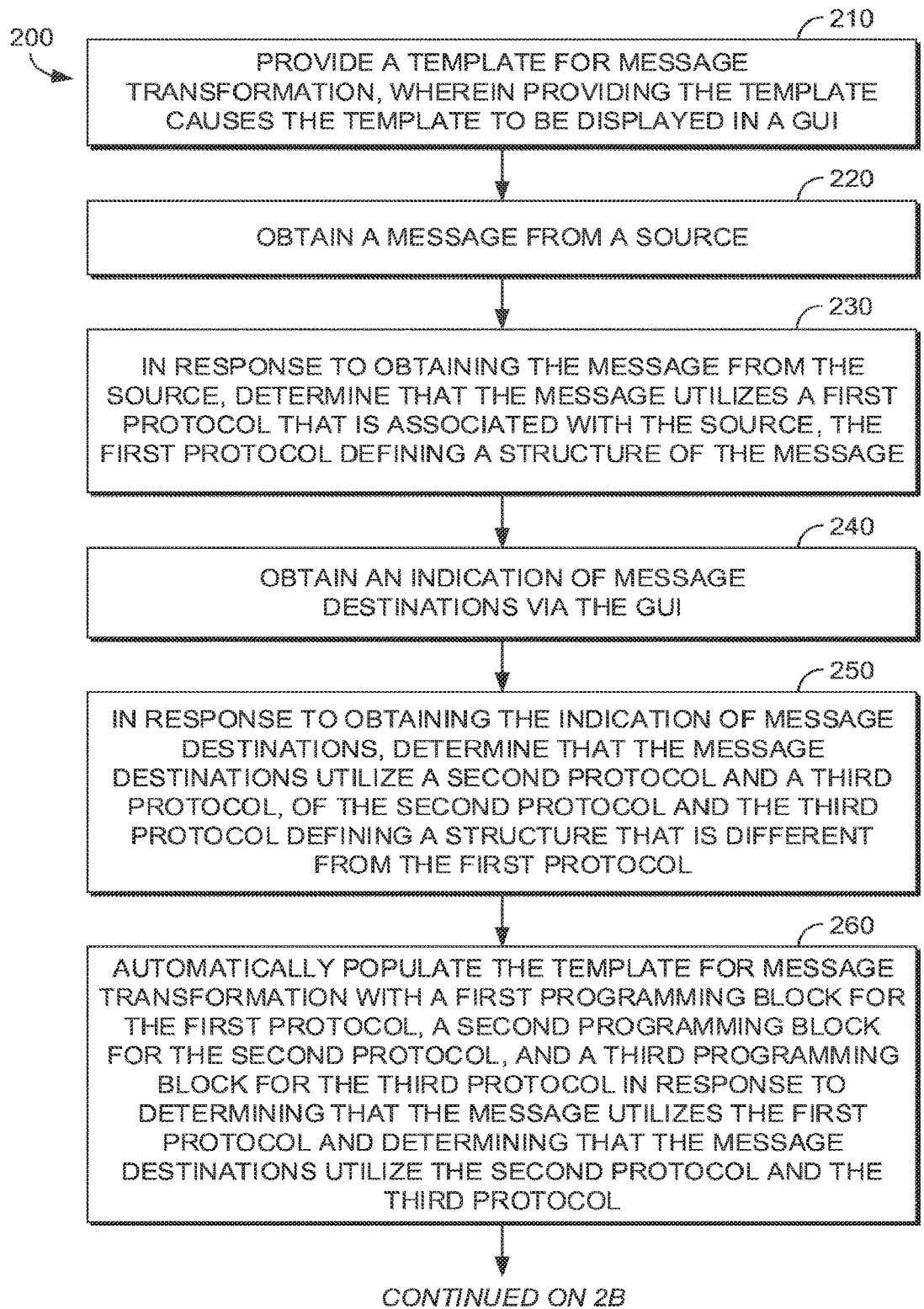
FIGS. 2A-2B depict a flow diagram of an exemplary method in accordance with an embodiment of the present invention.
Figure 2B:
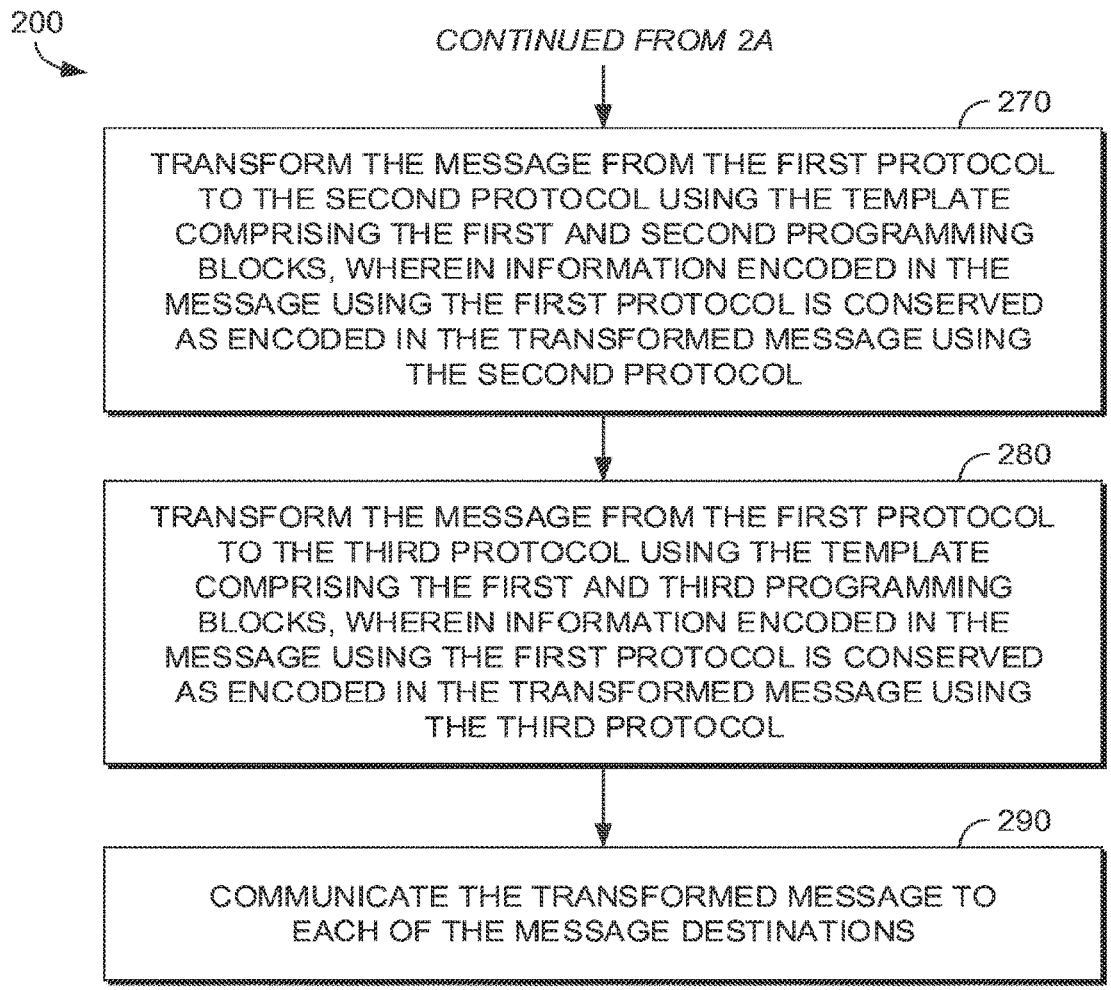

Turning now to FIGS. 2A-2B, a flow diagram of an exemplary method 200 in accordance with an embodiment of the present invention is provided. In some embodiments, the method 200 is performed by execution of computer-executable instructions embodied on one or more non-transitory computer-readable media. The method 200 may be performed using the systems described hereinafter. In embodiments, the method 200 may be performed through a graphical user interface (GUI) that is configured to generate or create a datafile, that datafile encoding a template that has been populated with programming blocks such that the datafile is usable for interface message mapping between an interface message source and an interface message endpoint (e.g., between two non-interoperable systems). The method 200 may be performed through a cloud-based application program interface (API) that generates the GUI, in some embodiments.

In an embodiment, the method 200 provides a template for message transformation, wherein providing the template causes the template to be displayed in a GUI, as shown in block 210. A message is also obtained from a source, at block 220. The message may be obtained before or after the template is provided for display in the GUI. The message obtained from the source may comprise two or more messages. Alternatively, the message obtained from the source may be one message. In response to obtaining the message from the source, the method 200 determines that the message utilizes a first protocol, where the first protocol is associated with the source, illustrated at block 230. Generally, the first protocol defines a structure of the message that is obtained from the source.

The method 200 continues by obtaining an indication of message destinations via the GUI, shown at block 240. As such, there may be multiple different destinations that are indicated. The indication of the message destinations may represent or correspond to one or more user selections of one or more graphic objects representing the one or more message destinations for insertion into the template via the GUI.

In response to obtaining the indication of message destinations, the method 200 determines that the message destinations utilize a second protocol and a third protocol, wherein each of the second protocol and the third protocol define a structure that is different from the first protocol, shown at block 250. For example, one of the message destinations may use the second protocol while another, distinct message destination uses the third protocol. The second and third protocols may be different from one another, in embodiments.

In accordance with the method 200, the template for message transformation is automatically populated with a first programming block for the first protocol, a second programming block for the second protocol, and a third programming block for the third protocol in response to determining that the message utilizes the first protocol and determining that the message destinations utilize the second protocol and the third protocol, shown at block 260. In an embodiment, automatically populating the template may comprise automatically selecting the first programming block in response to determining that the message utilizes the first protocol, wherein the first programming block is inserted into the template to populate the template and is displayed via the GUI. In one such embodiment, the first programming block comprises identifiers for labeling one or more structures in the message obtained from the source, the structure being defined by the first protocol. Identifiers may be used to label the message type, to differentiate different segments within the message, to numerate the sequence of segments in the message, to designate one or more structures (and information encoded therein) to be conserved in transformation, and to designate one or more structures (and information encoded therein) to be removed in transformation, for example. Additionally, in some embodiments, automatically populating the template may comprise automatically selecting the second programming block in response to determining that a second protocol is associated with the one or more message destinations, wherein the second programming block is inserted into the template to populate the template and is displayed via the GUI. In such embodiments, the second programming block comprises identifiers for labeling the one or more structures defined by the first protocol, and one or more structures defined by the second protocol to replace the one or more structures defined by the first protocol. For example, the identifiers numerating the sequence of structures in the message using the first protocol may be used to change the sequence of the structures during transformation so that the sequence of the structures complies with the second protocol.

At block 270, the message is transformed from the first protocol to the second protocol using the template comprising the first and second programming blocks. At block 280, the message is also transformed from the first protocol to the third protocol using the template comprising the first and third programming blocks. In some embodiments, the message may comprise multiple messages obtained from the source. In other embodiments, the message consists of one message. In accordance with the method 200, a single message may be transformed to generate more than one message, and as such, the input message may be transformed using the first and second programming blocks to create an output message the input message may also be transformed using the first and third programming blocks to create another or additional output message. In such an embodiment, the first programming block in the template may duplicate all or at least a portion of the one message. One or more of the duplicate(s) may be fed into to the second programming block where those one or more duplicate(s) are transformed to comply with the second protocol. Those one or more duplicates may subsequently be communicated to one or more message destinations that use or are otherwise associated with the second protocol. In another embodiment wherein the message consists of a single message, the first programming block in the template may duplicate all or at least a portion of the one message. One or more of the duplicate(s) may be fed into to the third programming block where those one or more duplicate(s) are transformed to comply with the third protocol. Those one or more duplicates may subsequently be routed to or otherwise communicated to one or more message destinations that use or are otherwise associated with the third protocol.

Generally, the information encoded in the message using the first protocol is conserved as encoded in the transformed message using the second protocol. Similarly, the information encoded in the message using the first protocol is conserved as encoded in the transformed message using the third protocol. The method 200 communicates the transformed messages to each of the message destinations, as shown at block 290. In further embodiments, the method 200 generates a datafile that encodes the populated template.

Figure 3A:
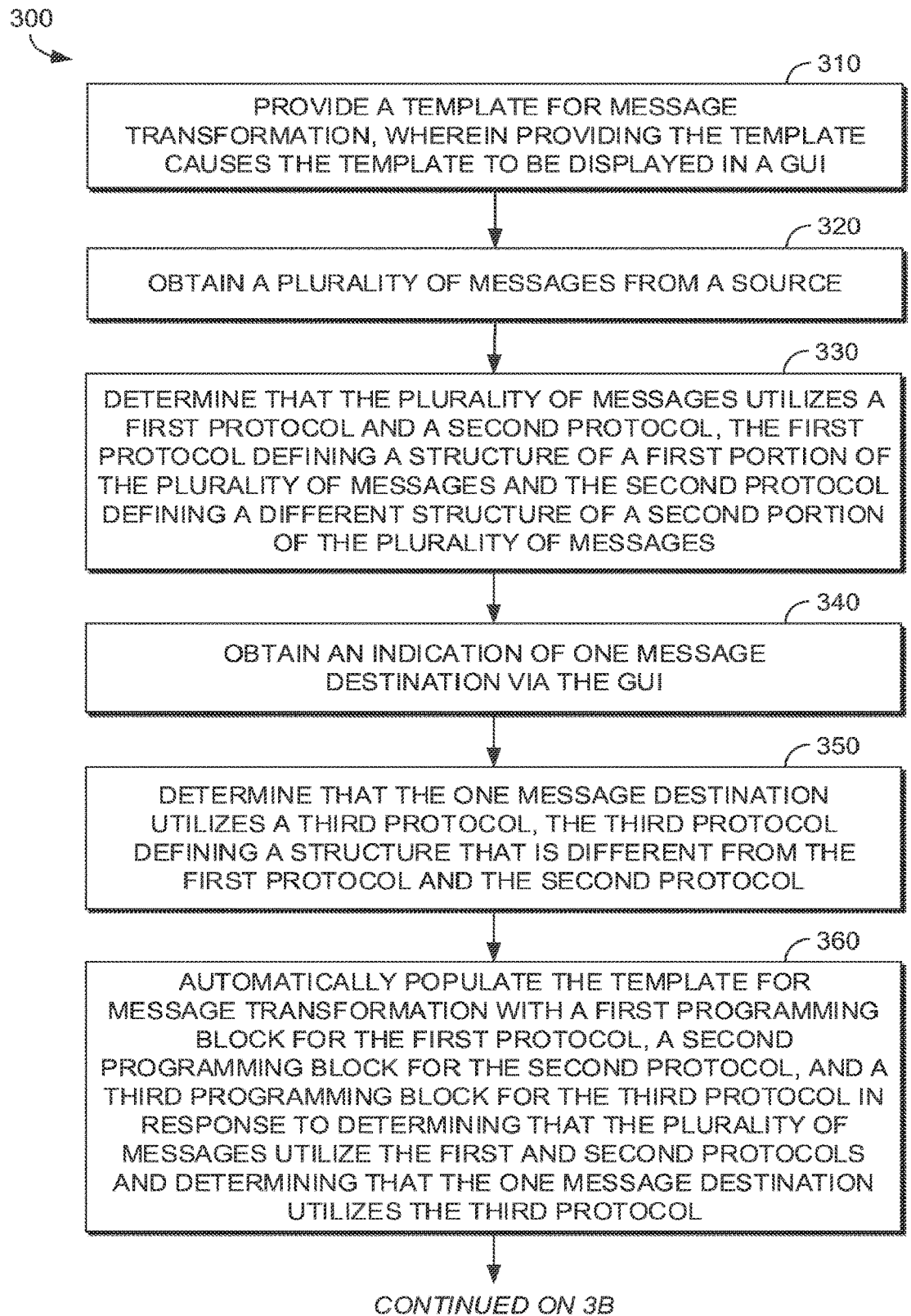

Turning now to FIGS. 3A-3B, a flow diagram of an exemplary method 300 in accordance with an embodiment of the present invention is provided. In some embodiments, the method 300 is performed by execution of computer-executable instructions embodied on one or more non-transitory computer-readable media. The method 300 may be performed using the systems described hereinafter. In embodiments, the method 300 may be performed through a graphical user interface (GUI) that is configured to generate or create a datafile, that datafile encoding a template that has been populated with programming blocks such that the datafile is usable for interface message mapping between an interface message source and an interface message endpoint (e.g., between two non-interoperable systems). The method 300 may be performed through a cloud-based application program interface (API) that generates the GUI, in some embodiments.

At block 310, the method 300 provides a template for message transformation, wherein providing the template causes the template to be displayed in a GUI. At block 320, the method 300 obtains a plurality of messages from a source. At block 330, the method 300 determines that the plurality of messages utilizes a first protocol and a second protocol, the first protocol defining a structure of a first portion of the plurality of messages and the second protocol defining a different structure of a second portion of the plurality of messages. Alternatively, in some embodiments, all of the plurality of messages may use the same protocol.

At block 340, the method 300 obtains an indication of one message destination via the GUI. In such embodiments, the plurality of messages is to be transformed for communication to one destination. At block 350, the method 300 determines that the one message destination utilizes a third protocol, the third protocol defining a structure that is different from the first protocol and the second protocol.

At block 360, the method 300 automatically populates the template for message transformation with a first programming block for the first protocol, a second programming block for the second protocol, and a third programming block for the third protocol in response to determining that the plurality of messages utilize the first and second protocols and determining that the one message destination utilizes the third protocol. Population of the template has been previously described herein. At block 370, the method 300 transforms the plurality of messages from the first protocol and the second protocol to the third protocol using the template comprising the first, second, and third programming blocks. Generally, the information encoded in the plurality of messages using the first and/or second protocols is conserved as encoded in the transformed messages using the third protocol. In other words, the information encoded using the first protocol as the first portion of messages is conserved as the first portion of message is transformed via the template to the third protocol. Also, the information encoded using the second protocol as the second portion of messages is conserved as the second portion of message is transformed via the template to the third protocol, for example. The transformed messages are derived from the plurality of messages. At block 380, the method 300 communicates the transformed message to the message destination.

As described herein above, embodiments provide a GUI that constructs a datafile which encodes an interface that performs one or more aspects of message "choreography," for example, by transforming a plurality of messages for communication to one destination associated with one or more protocols, by transforming one message for communication to a plurality of destinations associated with one or more protocols, and/or by transforming a plurality of messages for communication to a plurality of destinations associated with one or more protocols. The message choreography further refers to the various paths formed by the programming blocks in the specialized template produced through the GUI and encoded as a datafile. As described above, the embodiments herein are able to use one or more source messages to derive one or more destination messages. For example, a single source message may be used to derive two or more destination messages: Message A may be transformed into any number of destination messages, include Message B for destination B, Message C for destination C, Message D for destination D, Message N for destination n. As such, a single message is mapped to many destinations.

The methods discussed above may be performed using various system architecture, as discussed hereinafter.

Systems

At a high level, data flows from a source having a user access point through a back-end server. The back-end server may write the data flows to a datastore. The back-end server may further format the data flows into transactions, each transaction corresponds to an interface message, for example. The interface message provides information to a Field replaceable unit Support Interface (FSI), for example, where the FSI interprets the interface messages as corresponding to the occurrence of an event. The FSI will receive that event in the External System Outbound (ESO) server and the ESO server feeds the event to the back-end server for distribution, in some embodiments. At distribution, the event is handed to an ESO Script server, for example. The ESO Script server may call and retrieve data from a database, in an embodiment. The ESO Script server may then format the retrieved data into an HL7-like interface message and feed the interface message to a legacy communication server or an adapter, for example. From the legacy communication server or an adapter, the HL7-like interface message is sent to a Gateway and out to an endpoint or destination system, generally. Throughout the following descriptions of exemplary environments, the systems use a cloud-based application user interface and Java services, in embodiments, wherein the Java services are linked to an adapter, a gateway, or an adapter and a gateway.

Figure 4:
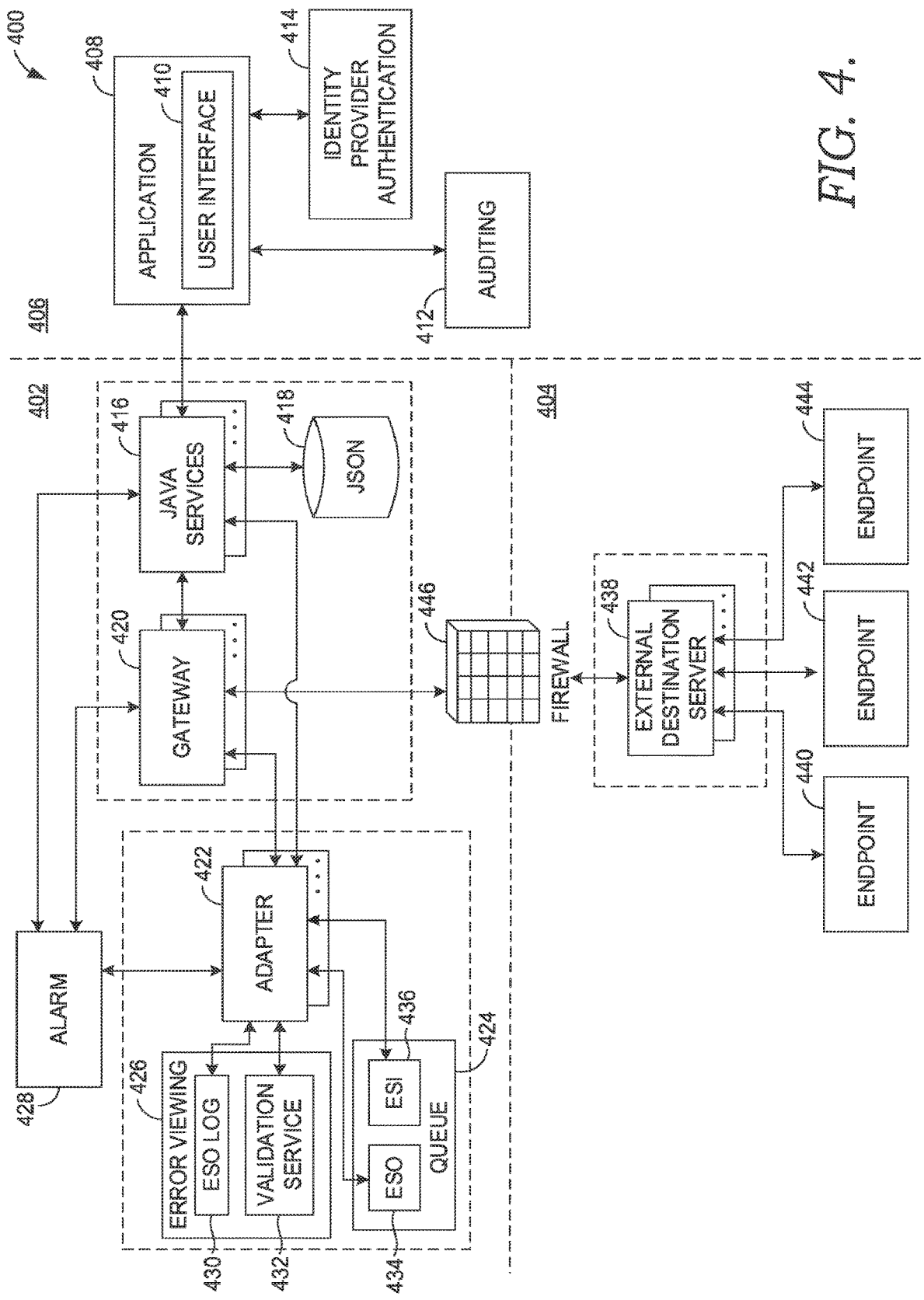
FIG. 4 depicts a block diagram of an exemplary environment suitable to implement embodiments of the present invention.

Turning to FIG. 4, a block diagram of an exemplary environment 400 suitable to implement embodiments of the present invention is shown. It will be understood, with regard to each of the systems described hereinafter, that components shown in the singular may be plural, and components shown in the plural may be singular, in various embodiments. In FIG. 4, the environment 400 comprises a host environment 402 and a client environment 404. The environment 400 comprises a cloud-based environment 406. The cloud-based environment 406 comprises an application programming interface (API) 408, the API 408 providing and supporting a user interface 410. The user interface 410 provides the GUI discussed previously regarding methods, in embodiments. The cloud-based environment 406 further comprises an auditing module 412 and an identity provider authentication module 414, in some embodiments. When an indication is received to launch the previously discussed GUI, a computing device is authenticated and provided access to the GUI via the user interface 410 in the API 408 of the cloud-based environment 406. The auditing module 412 tracks user interactions, once the computing device is connected to the API 408, for example.

Continuing, the host environment 402 communicates with the API 408 in the cloud-based environment 406 as shown in FIG. 4. In embodiments, the host environment 402 includes Java Services 416, a JSON database 418, a gateway 420, an adapter 422, a queue 424, an error viewing module 426, and an alarm module 428. In alternative embodiments, the host environment 402 has a port (not shown) and lacks the alarm module 428. The error viewing module 426 comprises an External Systems Outbound (ESO) log 430 and a validation service 432. The queue 424 comprises an External Systems Outbound (ESO) messages 434 and External Systems Inbound (ESI) messages 436. Generally, the Java Services 416 of the host environment 402 communicate with the API 408 in the cloud-based environment 406. The host environment 402 provides a Java-based integration engine.

The client environment 404 comprises an external destination server 438. The external destination server 438 may communicate with any number of endpoints, such as endpoints 440, 442, and 444. Generally, the host environment 402 and the external destination server 438 participate in bi-directional communications that pass through a firewall 446. At a high level, the external destination system 438 may send communications through the firewall 446 to the gateway 420 in the host environment 402.

The GUI discussed previously, and which is hosted through the API 408, provides for a custom interface to be built that transforms messages which are to be exchanged, for example, between the adapter 422 (e.g., source), passed through the gateway 420, and out to the endpoints 440, 442, 444. The adapter further enables troubleshooting, monitoring, archiving, and configuration functions described hereinafter. However, some embodiments may lack the adapter 422.

Figure 5:
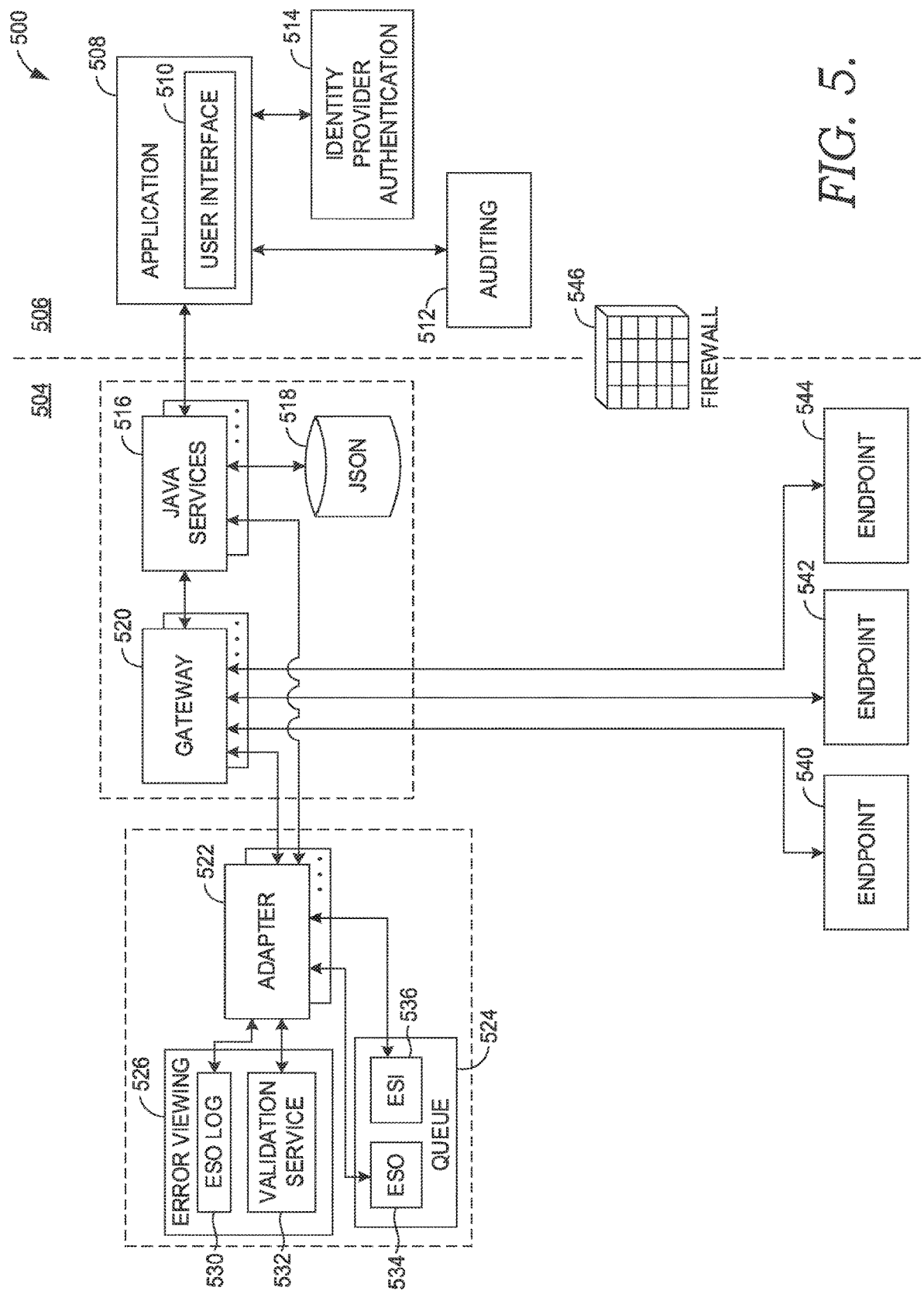
FIG. 5 depicts a block diagram of an exemplary environment suitable to implement embodiments of the present invention.

Turning to FIG. 5, a block diagram of an exemplary environment 500 suitable to implement embodiments of the present invention is shown. It will be understood, with regard to each of the systems described hereinafter, that components shown in the singular may be plural, and components shown in the plural may be singular, in various embodiments. In FIG. 5, the environment 500 comprises a client environment 504 and a cloud-based environment 506. The cloud-based environment 506 comprises an application programming interface (API) 508, the API 508 providing and supporting a user interface 510. The user interface 510 provides the GUI discussed previously regarding methods, in embodiments. The cloud-based environment 506 further comprises an auditing module 512 and an identity provider authentication module 514, in some embodiments. When an indication is received to launch the previously discussed GUI, a computing device is authenticated and provided access to the GUI via the user interface 510 in the API 508 of the cloud-based environment 506. The auditing module 512 tracks user interactions, once the computing device is connected to the API 508, for example.

In FIG. 5, the client environment 504 communicates with the API 508 in the cloud-based environment 506, wherein communications pass through a firewall 546. In embodiments, the client environment 504 includes Java Services 516, a JSON database 518, a gateway 520, an adapter 522, a queue 524, and an error viewing module 526. The error viewing module 526 comprises an External Systems Outbound (ESO) log 530 and a validation service 532. The queue 524 comprises an External Systems Outbound (ESO) messages 534 and External Systems Inbound (ESI) 536. Generally, the Java Services 516 of the client environment 504 communicates with the API 508 in the cloud-based environment 506. The client environment 504 hosts the Java-based integration engine of the environment 500. The client environment 504 communicates with any number of endpoints, such as endpoints 540, 542, and 544.

Figure 6:
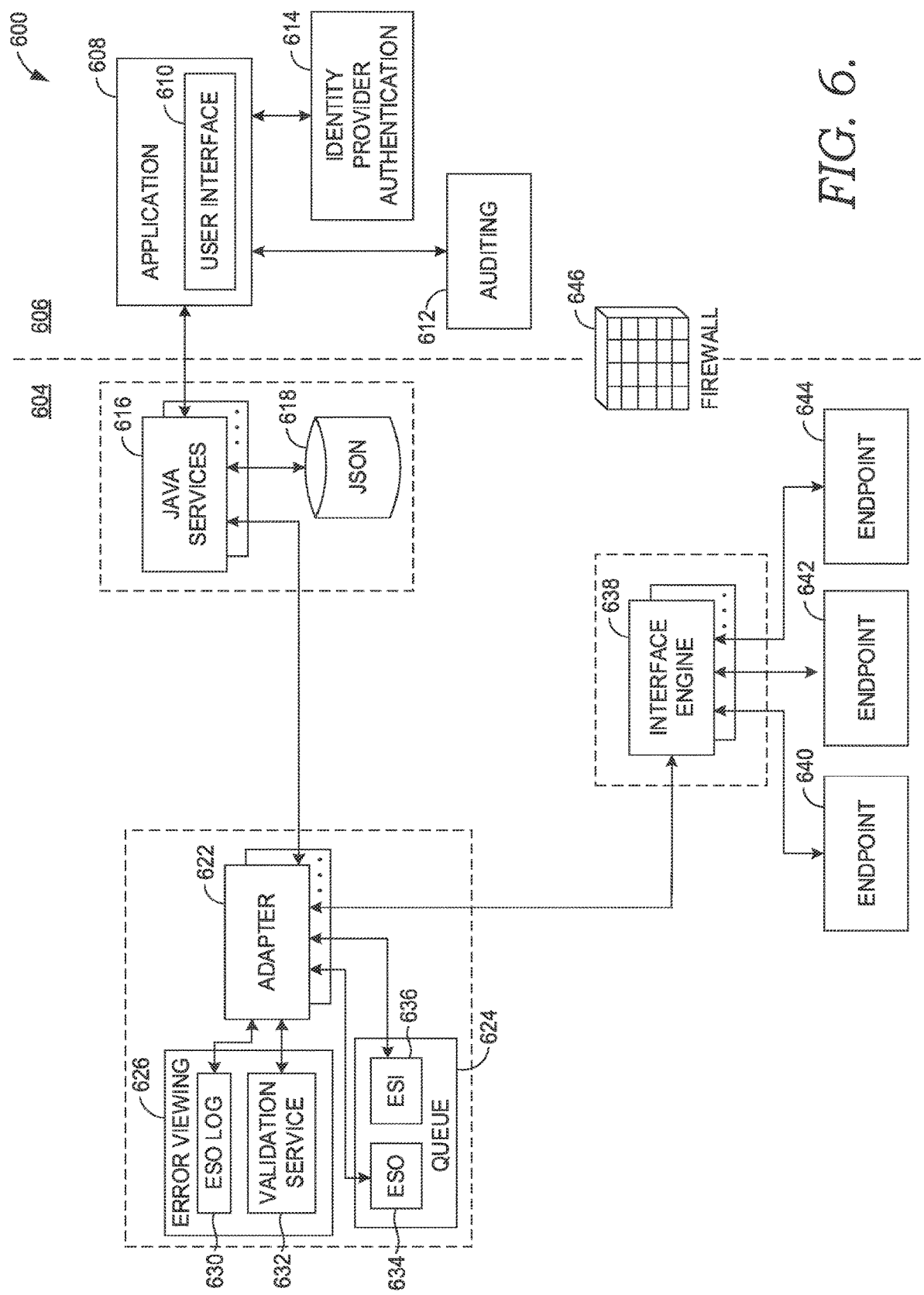
FIG. 6 depicts a block diagram of an exemplary environment suitable to implement embodiments of the present invention.

Continuing to FIG. 6, a block diagram of an exemplary environment 600 suitable to implement embodiments of the present invention is shown. It will be understood, with regard to each of the systems described hereinafter, that components shown in the singular may be plural, and components shown in the plural may be singular, in various embodiments. In FIG. 6, the environment 600 comprises a client environment 604 and a cloud-based environment 606. The cloud-based environment 606 comprises an application programming interface (API) 608, the API 608 providing and supporting a user interface 610. The user interface 610 provides the GUI discussed previously regarding methods, in embodiments. The cloud-based environment 606 further comprises an auditing module 612 and an identity provider authentication module 614, in some embodiments. When an indication is received to launch the previously discussed GUI, a computing device is authenticated and provided access to the GUI via the user interface 610 in the API 608 of the cloud-based environment 606. The auditing module 612 tracks user interactions, once the computing device is connected to the API 608, for example.

In FIG. 6, the client environment 604 communicates with the API 608 in the cloud-based environment 606, wherein communications pass through a firewall 646. In embodiments, the client environment 604 includes Java Services 616, a JSON database 618, an adapter 622, a queue 624, and an error viewing module 626. The error viewing module 626 comprises an External Systems Outbound (ESO) log 630 and a validation service 632. The queue 624 comprises an External Systems Outbound (ESO) messages 634 and External Systems Inbound (ESI) 636. Generally, the Java Services 616 of the client environment 604 communicates with the API 608 in the cloud-based environment 606. The client environment 604 hosts the Java-based integration engine of the environment 600. The adapter 622 communicates with any number of endpoints, such as endpoints 640, 642, and 644, through a third party interface engine 638.

Figure 7:
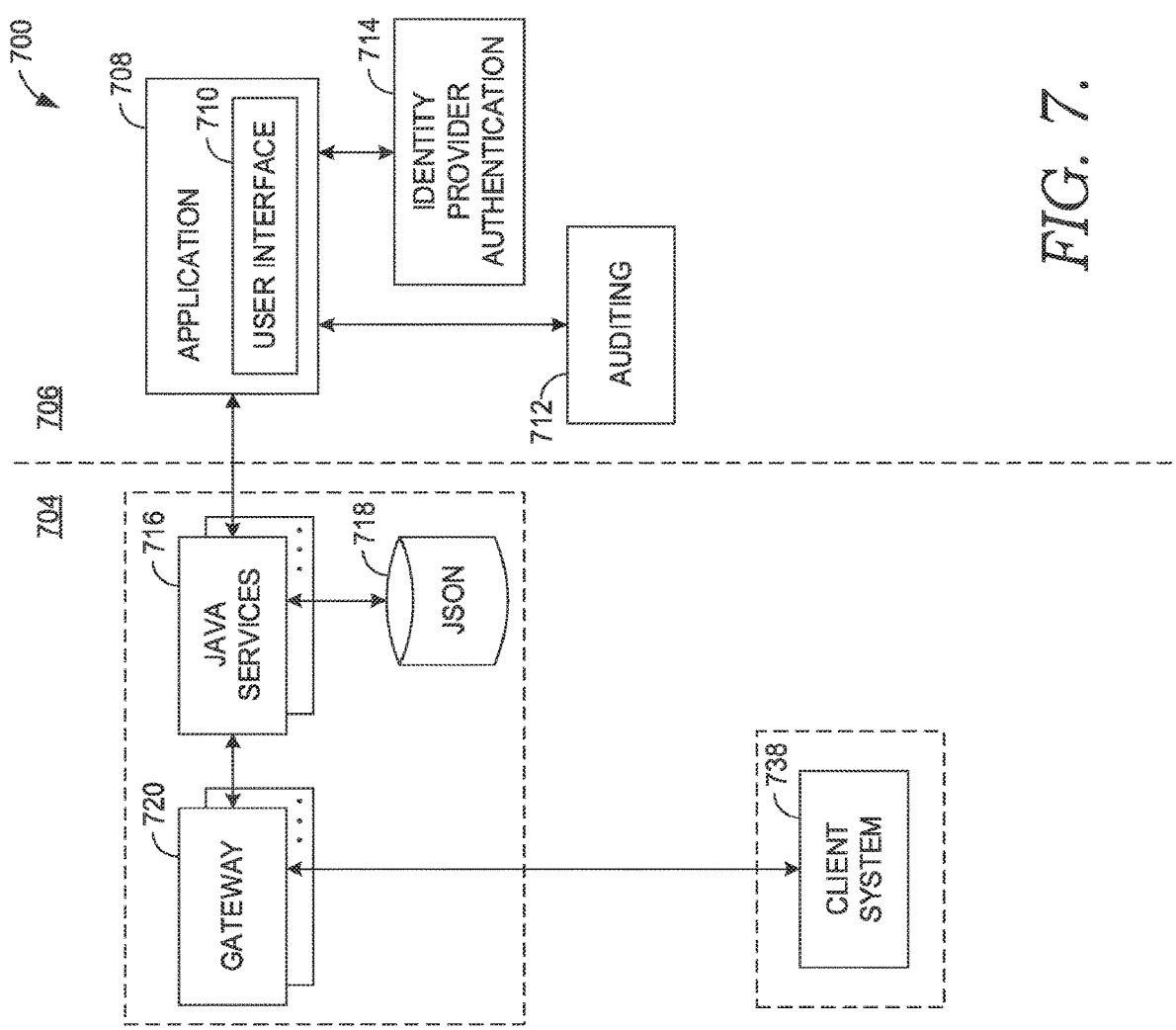
FIG. 7 depicts a block diagram of an exemplary environment suitable to implement embodiments of the present invention.

FIG. 7 provides a block diagram of an exemplary environment 700 suitable to implement embodiments of the present invention. It will be understood, with regard to each of the systems described hereinafter, that components shown in the singular may be plural, and components shown in the plural may be singular, in various embodiments. In FIG. 7, the environment 700 comprises a client environment 704 and a cloud-based environment 706. The cloud-based environment 706 comprises an application programming interface (API) 708, the API 708 providing and supporting a user interface 710. The user interface 710 provides the GUI discussed previously regarding methods, in embodiments. The cloud-based environment 706 further comprises an auditing module 712 and an identity provider authentication module 714, in some embodiments. When an indication is received to launch the previously discussed GUI, a computing device is authenticated and provided access to the GUI via the user interface 710 in the API 708 of the cloud-based environment 706. The auditing module 612 tracks user interactions, once the computing device is connected to the API 708, for example.

In FIG. 7, the client environment 704 communicates with the API 708. In an embodiment, the client environment 704 includes Java Services 716, a JSON database 718, and a gateway 720. Generally, the Java Services 716 of the client environment 704 communicates with the API 708. The client environment 704 hosts the Java-based integration engine of the environment 700. The gateway 720 communicates with a client system 738, in such embodiments.

Figure 8:
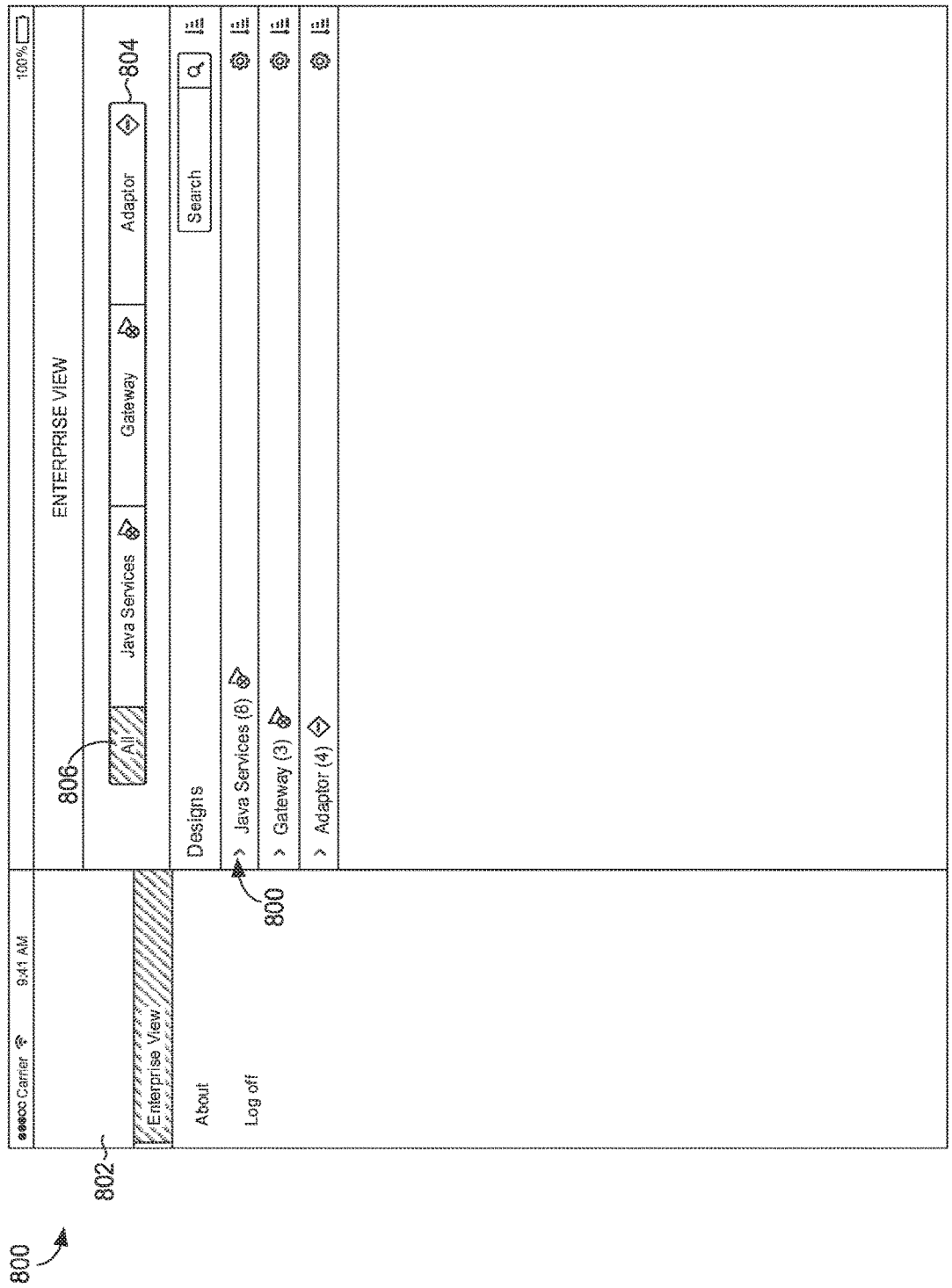
FIG. 8 depicts an exemplary graphical user interface (GUI) in accordance with embodiments of the present invention.
Figure 9:
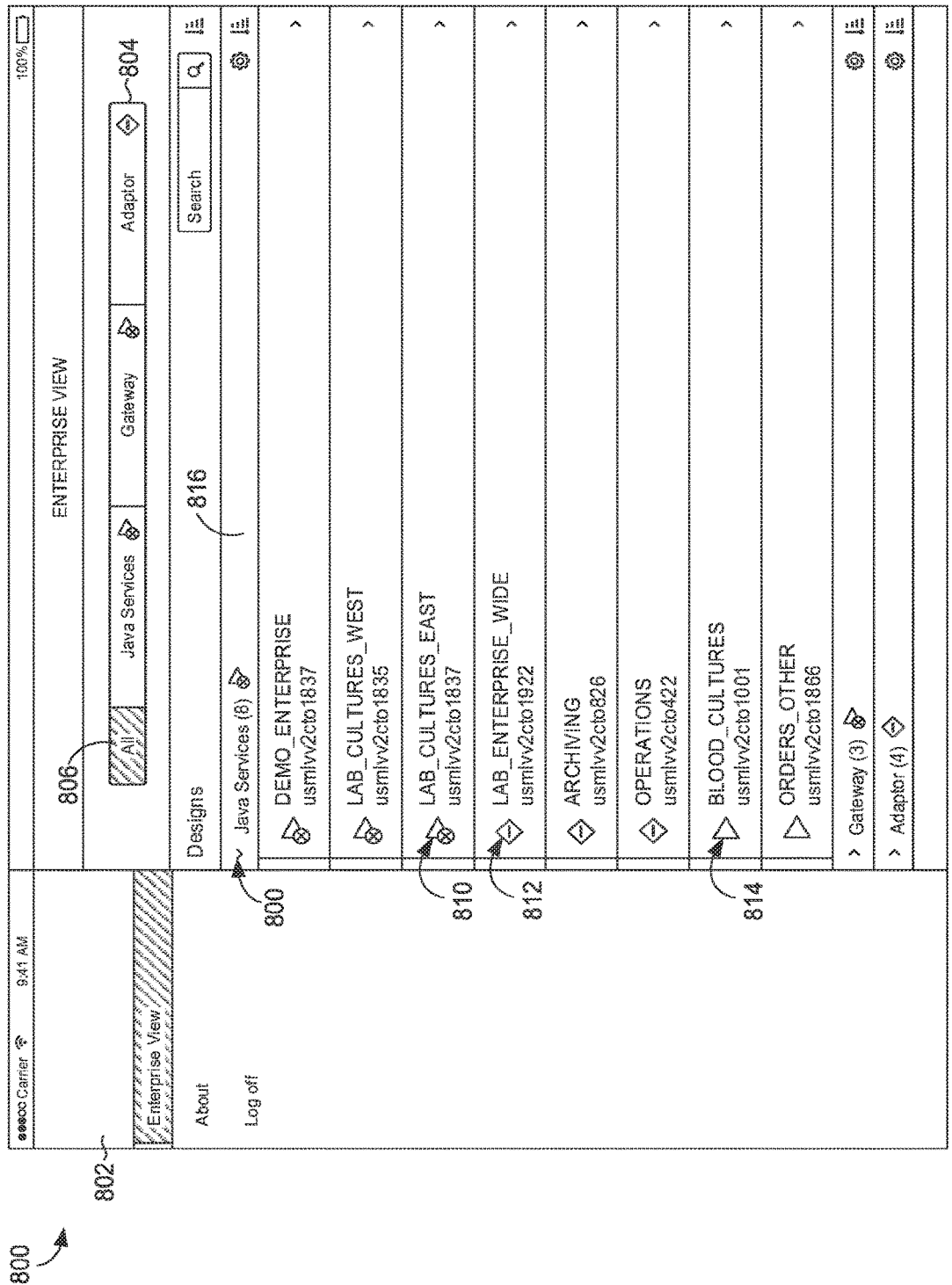
FIG. 9 depicts an exemplary GUI in accordance with embodiments of the present invention.

Continuing, through the systems discussed above, embodiments of the present invention provide additional functionality including monitoring and error review, validation, and archiving. The previously described methods provide the functionality of configuration of the integration engine, which is implemented through the systems discussed above. Regarding monitoring and error review, FIG. 8 provides an exemplary GUI 800. The GUI 800 provides monitoring visibility across the system. The GUI 800 includes a navigation pane 802 with selectable options and a menu bar 804 with selectable options. The navigation pane 802 and the menu bar 804 are concurrently displayed in the GUI 800. When an option is selected from the menu bar 804, the status of the selected one or more system components, such as a gateway, adapter, and Java Services, for example, are displayed. Selection of an "All" option 806 from the menu bar 804 provides a display of multiple system components, for example, as horizontal GUI object "blinds." Each blind is selectable to expand and display a list of detailed status and error information, for example, as shown in FIG. 9. The horizontal blinds may be collapsed and expanded, for example, by selecting the blind and/or by selecting an arrow icon 808 displayed on the blind. Status icons use symbols and color to indicate an error (e.g., icon 810 is a red circle with an internal "x"), a warning (e.g., icon 812 is a yellow diamond with an internal "-"), or operating (e.g., icon 814 is a green triangle) status. FIG. 9 displays one of the blinds 816 as expanded to display a detailed list of status and items affecting status within the system. In FIG. 8, the horizontal blinds are shown in a collapsed position.

Figure 10:
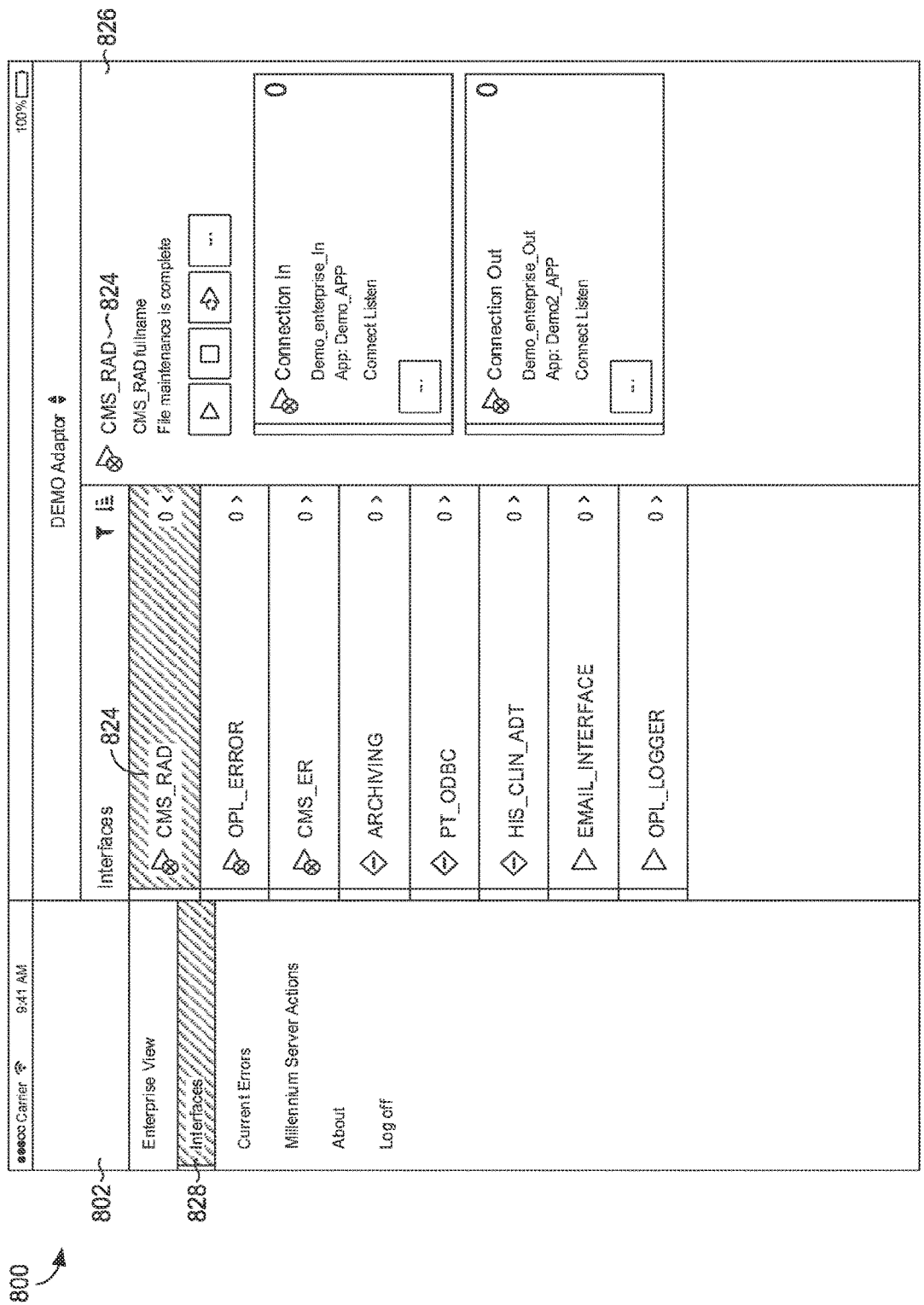
FIG. 10 depicts an exemplary GUI in accordance with embodiments of the present invention.

Additionally, selection of an "All" option 806 from the menu bar 804 provides a display of multiple system components, for example, as horizontal GUI object "blinds." When an individual blind is selected, the navigation pane 802 may expand and display secondary options nested within the navigation pane 802. For example, as shown in FIG. 9, selecting the option for the design "Demo" 818 under the blind "Java Services" 820 results in the navigation pane 802 expanding to display additional secondary options, as shown in FIG. 10. Further selection of a secondary menu option such as "Interfaces" 822 results in a concurrent display of monitoring information for configured interfaces that are within design "Demo" 818. Selection of one of the configured interfaces such as "CMS_RAD" 824 results in the display of additional monitoring information for that particular configured interface, as shown in FIG. 10. The monitoring information may be concurrently displayed in a connection panel 826.

At a high level, interface monitoring comprises checking whether, and how, an interface is operating, determining whether interface messages are continually passing through the interface, and determining whether the volume of interface messages is within a defined range. Additionally, interface monitoring does not require a user to refresh the GUI to display up-to-date information.

Through interface monitoring, a GUI provides visibility for the integration engine's inbound and outbound communications from a common user experience. For example, inbound and outbound interface messages traveling between the adapter and the gateway, communications or interactions between Java services and the adapter (e.g., TCP/IP communications), and communications or interactions between the gateway and an external destination server are monitored throughout the system and the GUIs discussed herein provide visibility throughout the system. The GUI for interface monitoring provides visibility of interface messages and displays a drill-down function to display information on component connections such as current operational state, engine functions, transaction backlogs, inbound/outbound transaction per time cycle, and last processed transaction timestamp statistics in chart and list format. Additionally, the monitoring function may provide reports on system performance. For example, the monitoring function provides visibility of, for example, the number of transactions sent in a specific time period by transaction name and event (inbound and outbound), uptime per interface, the number of batches sent through, the number of acknowledged (ACK'ed) interface messages, the number of non-acknowledged (NAK'ed) interface messages, the total bytes moved, and/or average transaction size. The monitoring function may be tailored to generate reports of information for specific components, such as the adapter or gateway, for example.

Figure 11:
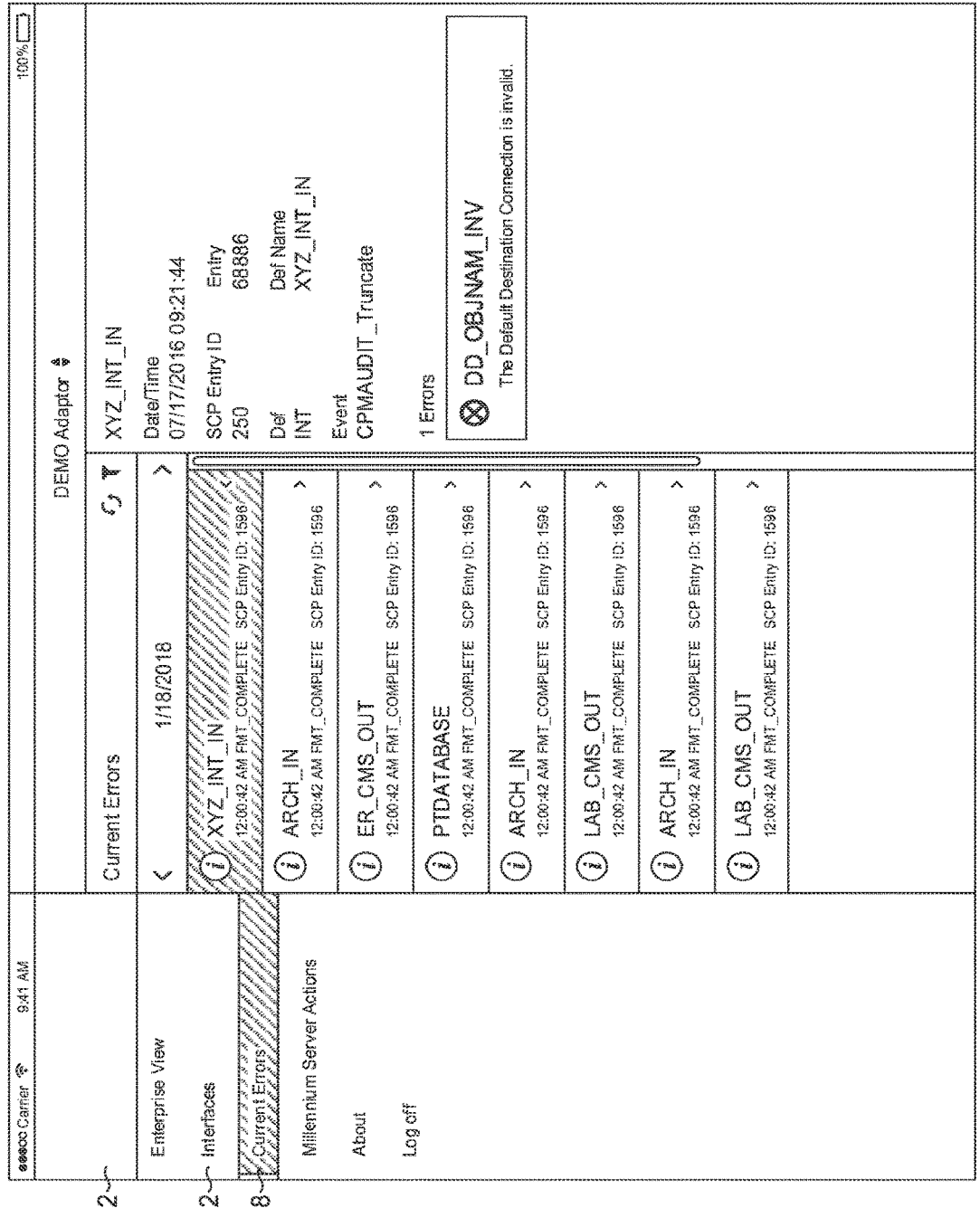
FIG. 11 depicts an exemplary GUI in accordance with embodiments of the present invention.

Continuing, as shown in FIG. 11, a selection of a secondary menu option such as "Current Errors" 828 from the navigation pane 802 results in the display of current error information for the currently selected design "Demo" 818. A list of current errors that are identified, based on on-going monitoring, are displayed for further selection. Further selection of current errors in the list displays detailed information so that a user may drill-down into the specifics of the current errors for the design "Demo." Accordingly, at a high level, a detailed error log is generated by monitoring interface messages traveling through the system. The error review provides information at a high level of granularity such that a fix can be generated without requiring re-creation of the error. Further, the GUI 800 provides monitoring and error information such that there is visibility of interface errors across multiple system components, all presented within one common GUI. For example, interface errors originating from Java Services, an adapter, and/or a gateway are visible within a common GUI. This is an improvement over other technologies, which did not provide system-wide visibility of monitoring and error reporting within a common GUI.

Figure 12:
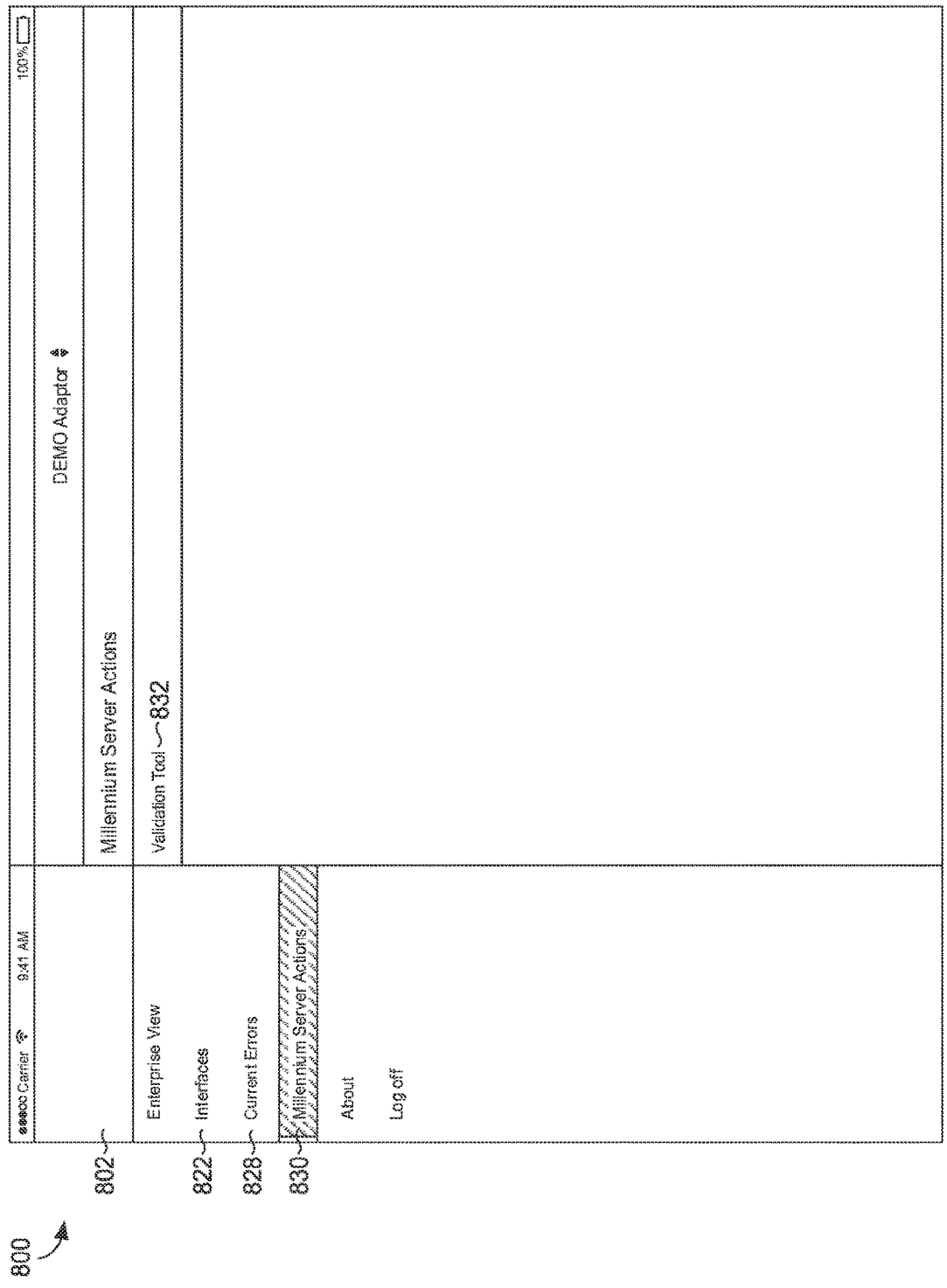
FIG. 12 depicts an exemplary GUI in accordance with embodiments of the present invention.
Figure 13:
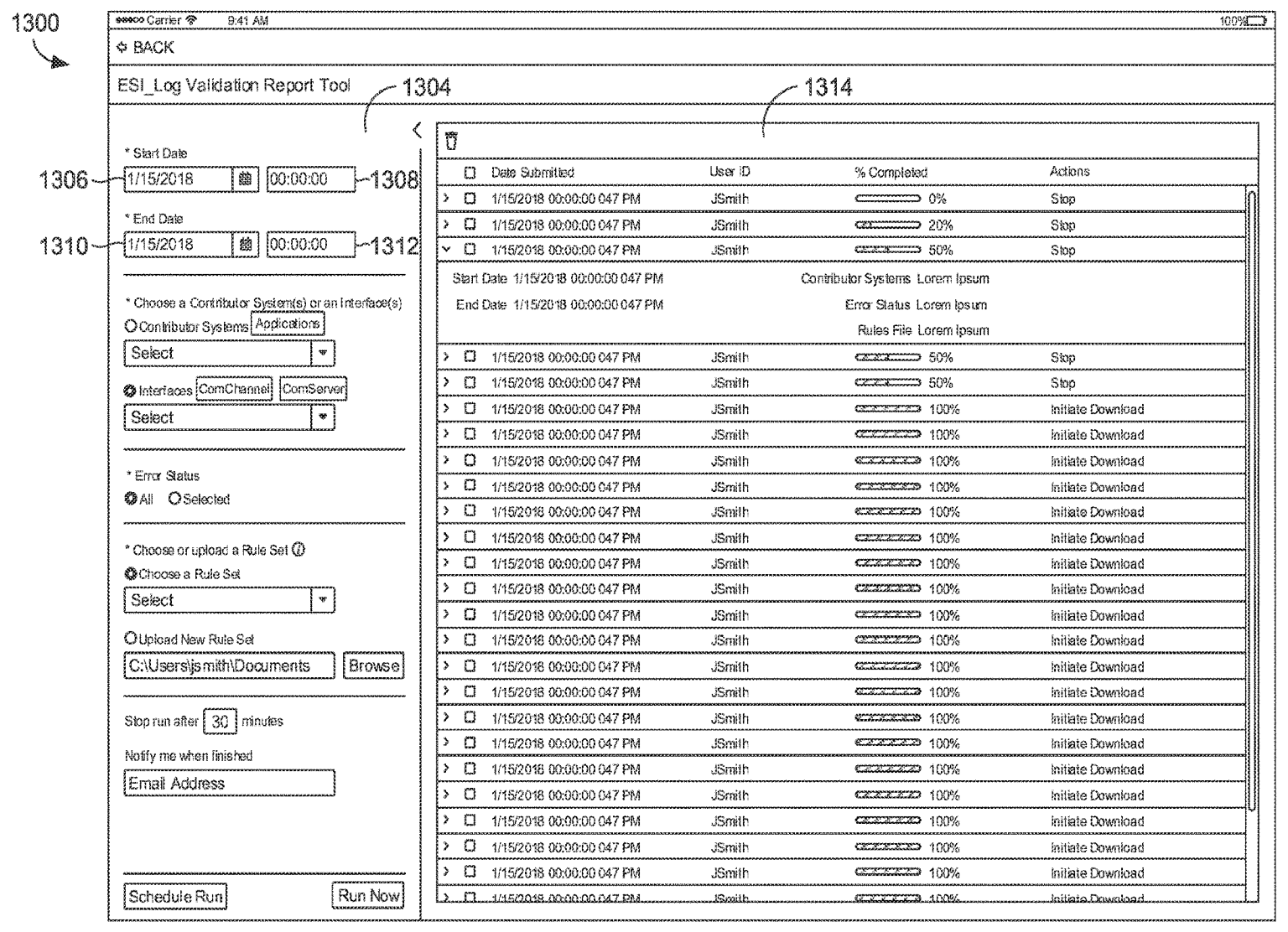

As shown in FIG. 12, a selection of a secondary menu option such as "Server Actions" 830 from the navigation pane 802 results in the display of a link 832 to a validation tool. Selection of the link launches the validation tool. FIG. 13 provides an exemplary GUI 1300 for a validation tool. The initial validation window 1302 shown in FIG. 13 provides a parameterization pane 1304 having one or more input boxes, the one or more input boxes being configured to receive user input. The user input is used to define parameters that constrain the errors in the system to be validated, as previously discussed. For example, the validation service attempted to validate each error in the ESO log regarding communications of the adapter. Exemplary input boxes in the parameterization pane 1304 include a start date input box 1306, a start time input box 1308, an end date input box 1310, and an end time input box 1312. The one or more input boxes are configured to receive user input that specifies, for example, a month, a day (i.e., numerical), a year, an hour, a minute, and seconds, which are used to constrain or limit the errors pulled from the ESO log to only those errors logged within the time frame or time period defined by the one or more input boxes. A list 1314 of errors may be concurrently displayed in the GUI 1300 with the parameterization pane 1304.

Figure 14:
FIG. 14 depicts an exemplary GUI in accordance with embodiments of the present invention.

The parameterization pane 1304 may further comprise input boxes configured to receive parameters that define contributor system(s), interface(s), error status (e.g., list 1314 of errors may display all errors independent of status, errors with a failure status, errors with retry status, errors with success status, and/or errors with information status). For example, FIG. 14 provides the exemplary GUI 1300 wherein a "contributor systems" option 1316 has been selected and a plurality of contributor systems 1318 have been populated by user input to constrain the errors to be validated. In exemplary FIG. 14, a "selected error" status option 1320 has been selected and the option of "info" status 1322 has been selected by user input to constrain the errors to be validated.

Figure 15:
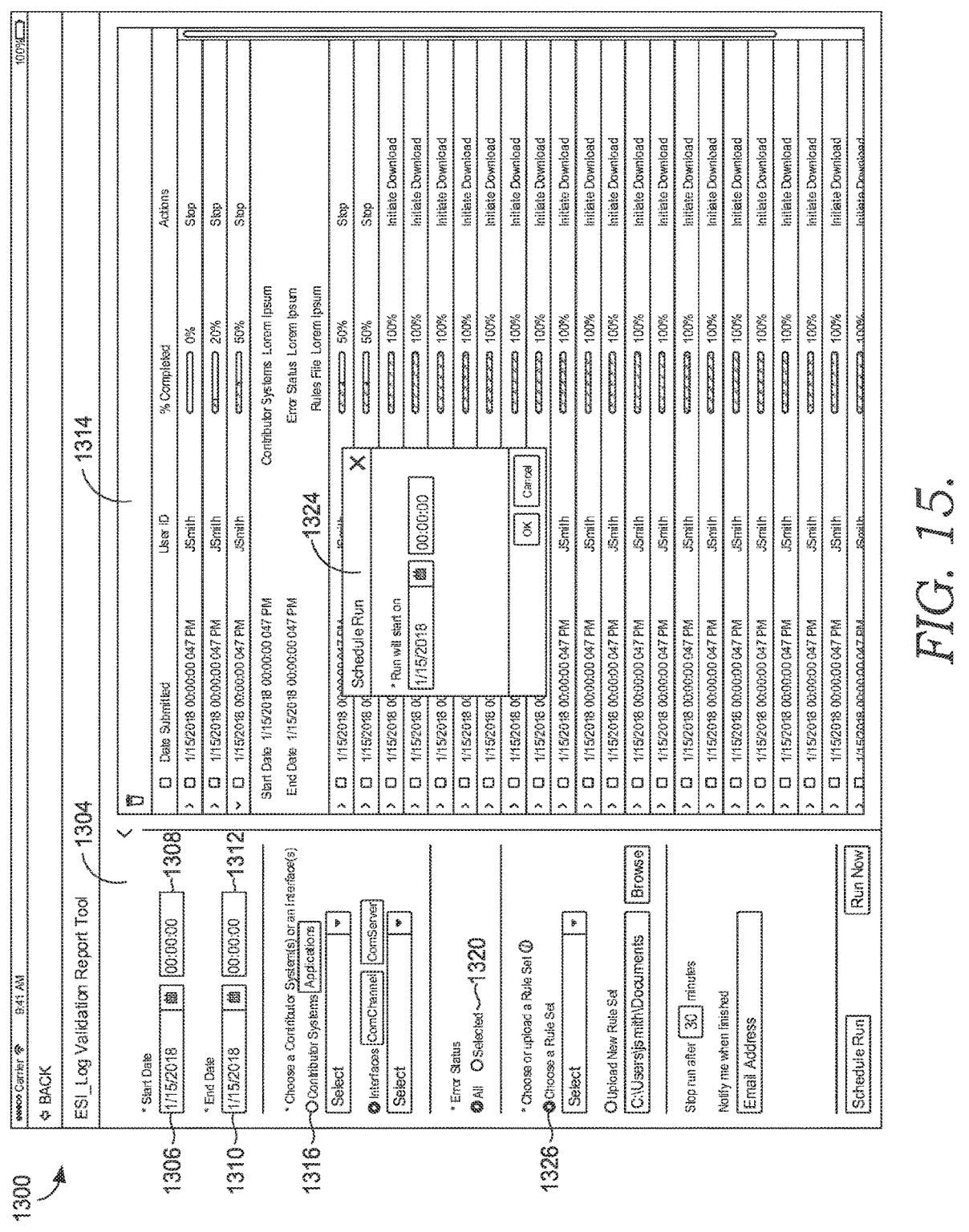
Figure 16:
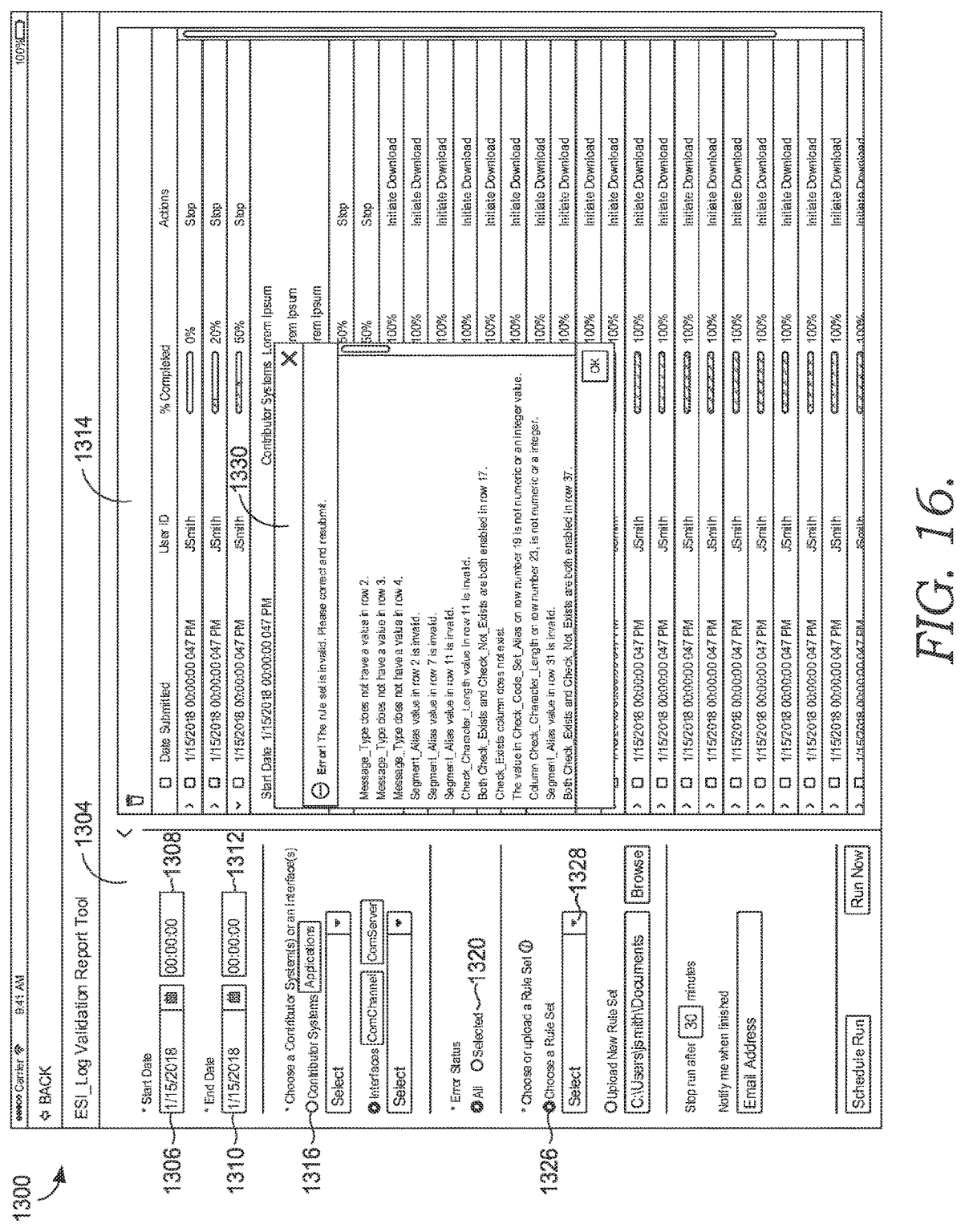

Continuing to FIG. 15, performance or error validation may be scheduled for a specific run time (e.g., date and time). A pop-up window 1324 may be presented in front of the list 1314, in some embodiments, and the pop-up window 1324 may include one or more input boxes configured to receive user input of a specific run time (e.g., date and time) for the validation service to perform validation of errors. In FIG. 16, a rule set may be designated by selecting a "Choose a Rule Set" option 1326 and further selecting a rule set from a drop-drop menu 1328. An example of a rule set invalid warning with a listing of errors in the rule set is shown in the pop-up window 1330. The rule set is to be used by the validation services to perform validation, for example, as shown in FIG. 17.

For example, a rule set may determine, for each interface message, one or more of a message type, an HL7 Version, element(s) in the interface message, segment(s) in the interface message, a field number for field(s) in the interface message, component(s) in the interface message, and/or sub-components in the interface message. The rule set may perform a value check to determine, for example, whether an element exists (e.g., element is present in interface message or is not), the value of each element (e.g., value is 12345 or ADCDE, or the element lacks a value), the character length of each element, whether an element is numeric, an expected value of the element, a code set alias, and/or whether the value is a unique identifier (e.g., a medical record number (MRN) or a foreign identification number (FIN)).

Figure 17:
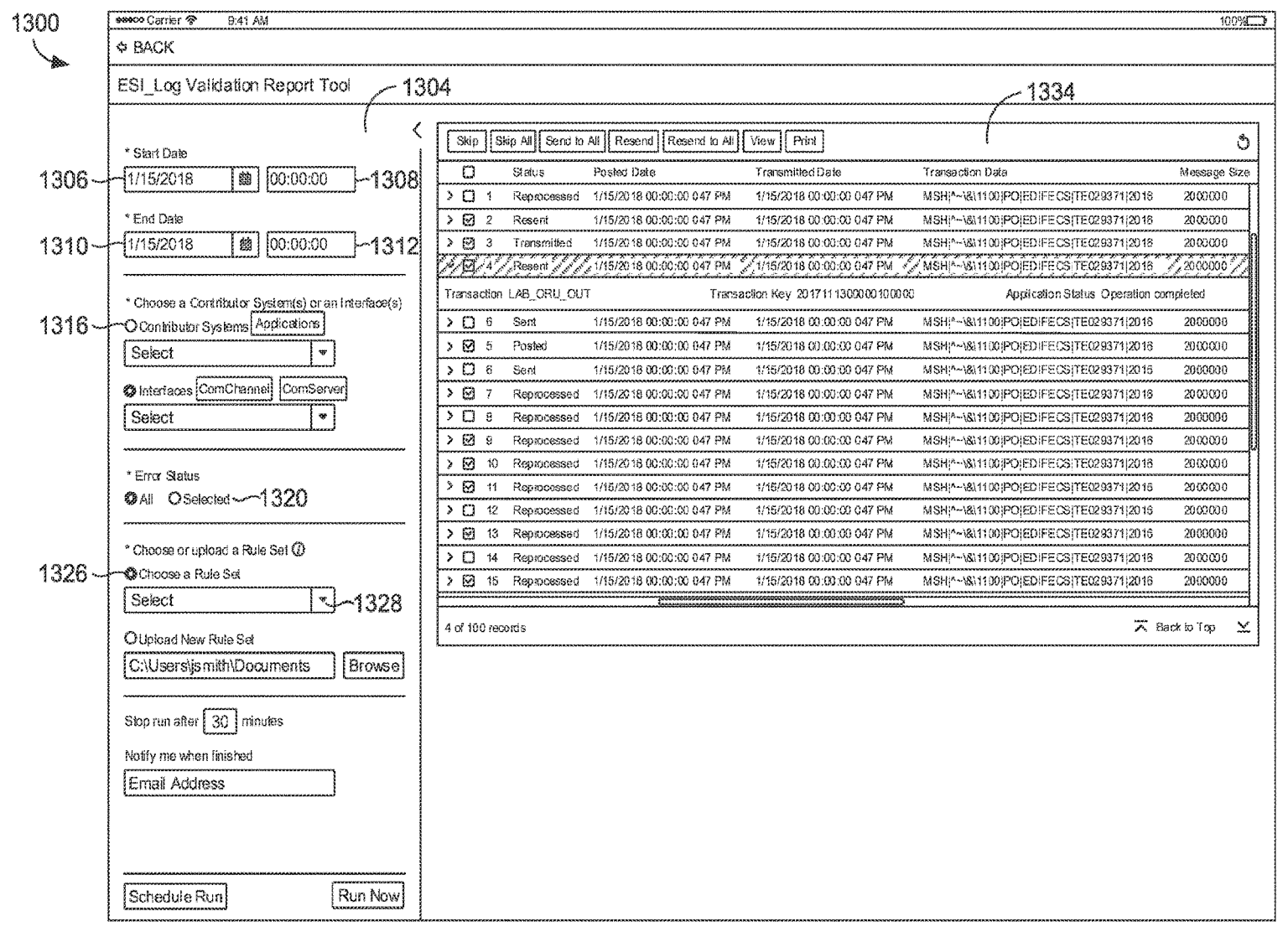
Figure 18:
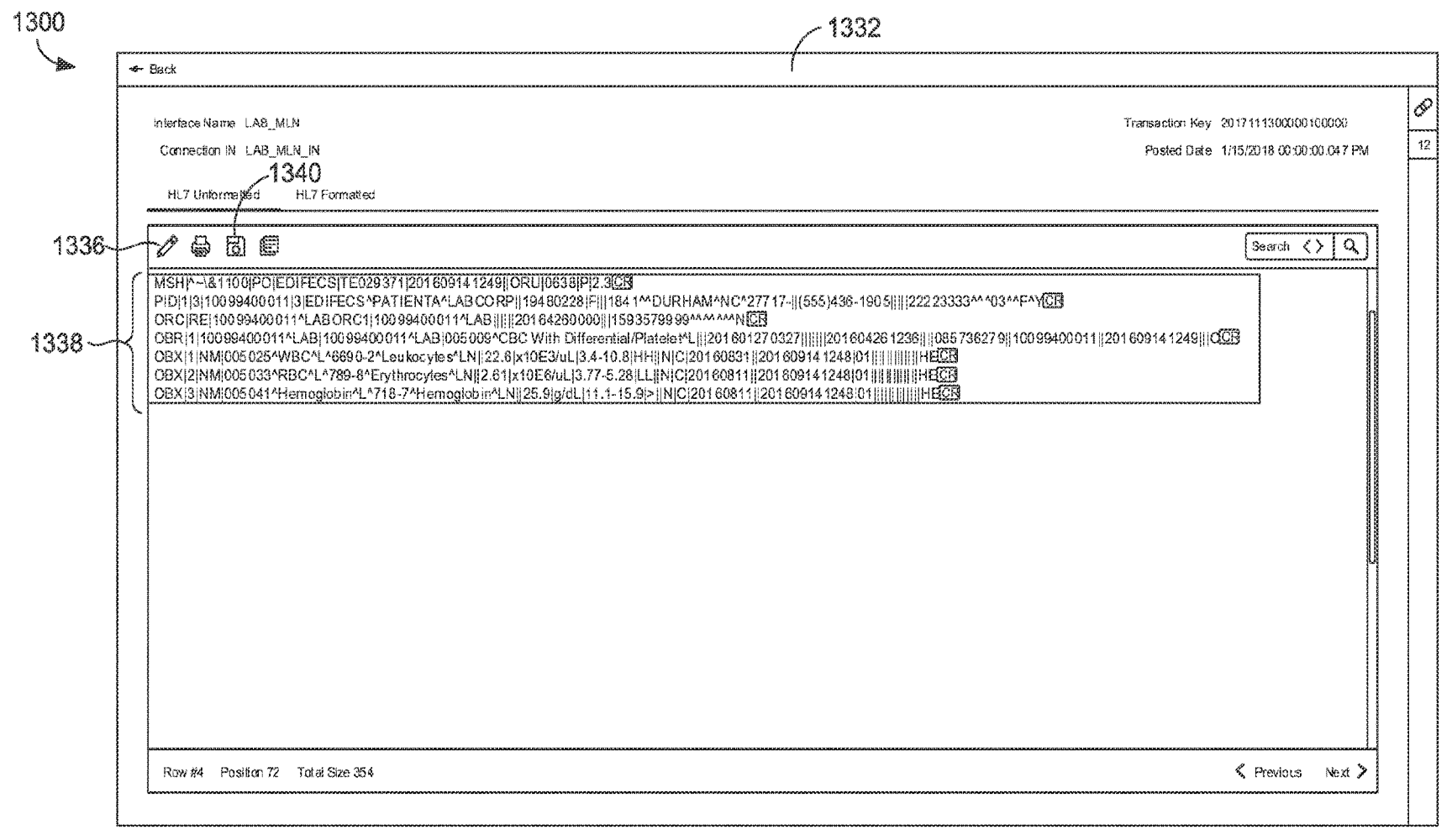

In FIG. 17, a list of errors is shown wherein the validation service has applied a rule set to the errors in order to perform validation (or fail validation) of each error. Each error may be identified by a number, a status, a posted date, a transmitted date, a message size (e.g., the interface message producing the error and/or which failed), and interface message data (e.g., the data content of the interface message). Each individual error in the list of errors is selectable, for example, in order to drill down into the details of the interface message that produced the error. For example, selection of the one error designated as number "4" in the list of exemplary FIG. 17 results in the display of a window, pane, or pop-up with the data content of the interface message responsible for the error. For example, FIG. 18 provides an exemplary interface message error review window 1332. In the interface message error review window 1332, the data content of the interface message is displayed. In exemplary FIG. 18, the interface message is an HL7 message.

Returning to FIG. 17, the previously described systems also archive interface messages, and these archived interface messages are reviewable through a common GUI for the additional purposes of monitoring, error reviewing, and validation. For example, as shown in FIG. 17, archived interface messages are searchable and reviewable. The archived inbound and/or outbound interface messages may be sent, skipped, exported, printed, or resent, as shown in FIG. 17, which provides a button bar 1334 with individual buttons enabling such functions. Interface messages may further be linked to one another. Additionally, the archived interface messages may be individually edited, as shown in FIG. 18. For example, FIG. 18 includes an edit button 1336 which may be selected to enable editing of the data content 1338 of the interface message. Therefore, the interface message may be edited to correct an error as shown in FIG. 18 (e.g., errors found through the validation tool), saved (e.g., disk icon button 1340) as shown in FIG. 18, and then sent or resent as an outbound interface message, using the corresponding send or resend buttons shown in FIG. 17. The metadata and/or data content of the interface message shown in FIG. 18 may also be viewed as HL7, XML, and JSON, in embodiments.

Figure 19:
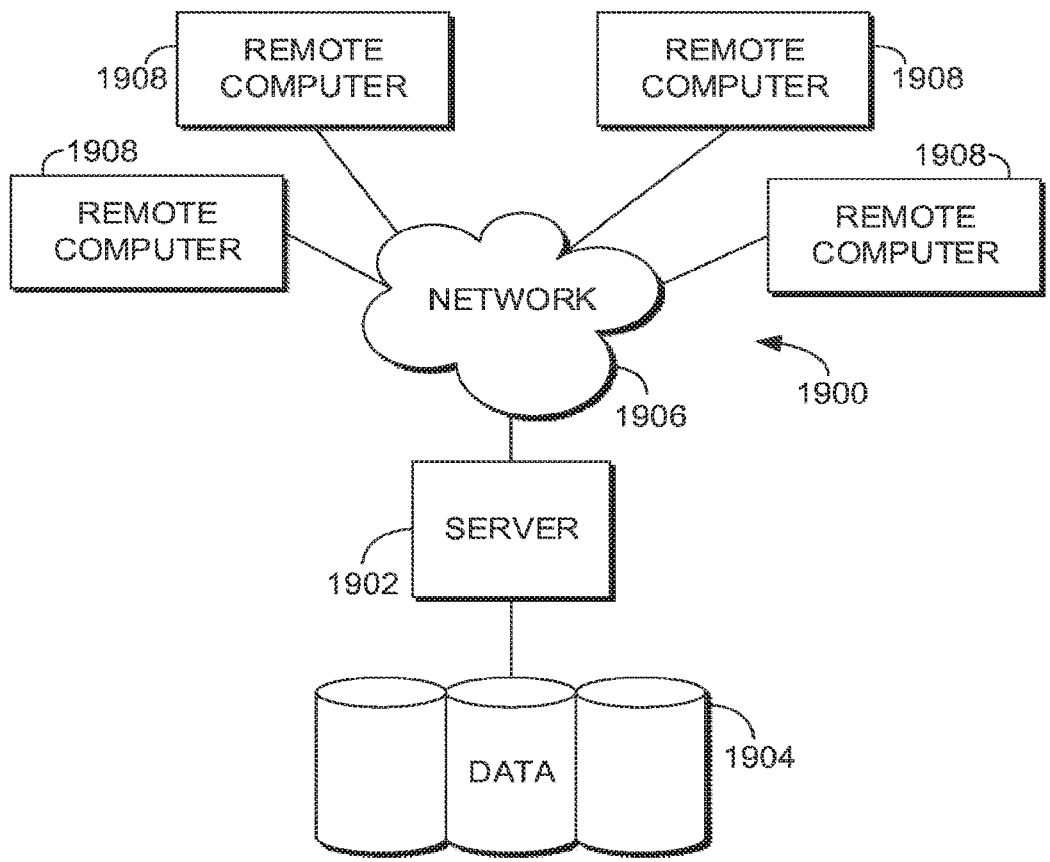
FIG. 19 depicts a block diagram of an exemplary environment suitable to implement embodiments of the present invention.

FIG. 19 depicts a block diagram of an exemplary environment suitable to implement embodiments of the present invention throughout the stages of Interface Build, Validation, and Testing. The exemplary computing environment 1900 is suitable to implement embodiments of the present invention. It will be understood by those of ordinary skill in the art that the exemplary computing environment 1900 is just one example of a suitable computing environment and is not intended to limit the scope of use or functionality of the present invention. Similarly, the exemplary computing environment 1900 should not be interpreted as imputing any dependency and/or any requirements with regard to each component and combination(s) of components illustrated in FIG. 19. It will be appreciated by those having ordinary skill in the art that the connections illustrated in FIG. 19 are also exemplary as other methods, hardware, software, and devices for establishing a communications link between the components, devices, systems, and entities, as shown in FIG. 19, may be utilized in implementation of the present invention. Although the connections are depicted using one or more solid lines, it will be understood by those having ordinary skill in the art that the exemplary connections of FIG. 19 may be hardwired or wireless, and may use intermediary components that have been omitted or not included in FIG. 19 for simplicity's sake. As such, the absence of components from FIG. 19 should not be interpreted as limiting the present invention to exclude additional components and combination(s) of components. Moreover, though devices and components are represented in FIG. 19 as singular devices and components, it will be appreciated that some embodiments may include a plurality of the devices and components such that FIG. 19 should not be considered as limiting the number of a device or component.

Continuing, the exemplary computing environment 1900 of FIG. 19 is illustrated as being a distributed environment where components and devices may be remote from one another and may perform separate tasks. The components and devices may communicate with one another and may be linked to each other using a network 1906. The network 1906 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 1906, generally, provides the components and devices access to the Internet and web-based applications.

The exemplary computing environment 1900 comprises a computing device. In some embodiments, the computing device is in the form of a server 1902. Although illustrated as one component in FIG. 19, the present invention may utilize a plurality of local servers and/or remote servers in the exemplary computing environment 1900. The server 1902 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 1902 may include or may have access to computer-readable media. Computer-readable media can be any available media that may be accessed by server 1902, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 1902. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 1902 uses logical connections to communicate with one or more remote computers 1908 within the exemplary computing environment 1900. In embodiments where the network 1906 includes a wireless network, the server 1902 may employ a modem to establish communications with the Internet, the server 1902 may connect to the Internet using Wi-Fi or wireless access points, or the server 1902 may use a wireless network adapter to access the Internet. The server 1902 engages in two-way communication with any or all of the components and devices illustrated in FIG. 19, using the network 1906. Accordingly, the server 1902 may send data to and receive data from the remote computers 1908 over the network 1906.

Although illustrated as a single device, the remote computers 1908 may include multiple computing devices. In an embodiment having a distributed network, the remote computers 1908 may be located at one or more different geographic locations. In an embodiment where the remote computers 1908 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 1908 are physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 1908 may be physically located in a non-medical setting, such as a packing and shipping facility or deployed within a fleet of delivery or courier vehicles.

Continuing, the exemplary computing environment 1900 includes a datastore 1904. Although shown as a single component, the datastore 1904 may be implemented using multiple datastores that are communicatively coupled to one another, independent of the geographic or physical location of a memory device. Exemplary datastores may also store data in the form of electronic records, for example, electronic medical records of patients, transaction records, billing records, task and workflow records, chronological event records, and the like.

Generally, the datastore 1904 includes physical memory that is configured to store information encoded in data. For example, the datastore 1904 may provide storage for computer-readable instructions, computer-executable instructions, data structures, data arrays, computer programs, applications, and other data that supports the functions and action to be undertaken using the exemplary computing environment 1900 and components shown in exemplary FIG. 19.

In a computing environment having distributed components that are communicatively coupled via the network 1906, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular data types. In embodiments, the server 1902 may access, retrieve, communicate, receive, and update information stored in the datastore 1904, including program modules. Accordingly, the server 1902 may execute, using a processor, computer instructions stored in the datastore 1904 in order to perform embodiments described herein.

Although internal components of the devices in FIG. 19, such as the server 1902, are not illustrated, those of ordinary skill in the art will appreciate that internal components and their interconnection are present in the devices of FIG. 19. Accordingly, additional details concerning the internal construction of the device are not further disclosed herein.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. One or more computer-readable storage media storing computer instructions thereon for execution by one or more processors to perform a method, the media comprising:
   providing a template for message transformation, wherein providing the template causes the template to be displayed in a GUI;
   obtaining one message from a source;
   in response to obtaining the one message from the source, determining that the one message utilizes a first protocol that is associated with the source, the first protocol defining a structure of the message;
   obtaining an indication of message destinations via the GUI;
   in response to obtaining the indication of message destinations, determining that the message destinations utilize a second protocol and a third protocol, each of the second protocol and the third protocol defining a structure that is different from the first protocol;
   automatically populating the template being displayed in the GUI for message transformation with a first programming block for the first protocol, a second programming block for the second protocol, and a third programming block for the third protocol in response to determining that the message utilizes the first protocol and determining that the message destinations utilize the second protocol and the third protocol;
   concurrently transforming the one message from the first protocol to the second protocol to form a second message using the first and second programming blocks and from the first protocol to the third protocol to form a third message using the first and third programming blocks, wherein information encoded in the one message using the first protocol is conserved as encoded in the second message using the second protocol, and wherein the information encoded in the one message using the first protocol is conserved as encoded in the third message using the third protocol;
   communicating the second and third messages to each of the message destinations;
   monitoring the plurality of messages received from the plurality of sources and the plurality of transformed messages communicated to the plurality of destinations; and
   providing, via the GUI, a report on system performance that includes a total quantity of the plurality of messages received from the plurality of sources, a total quantity of the plurality of transformed messages communicated to the plurality of destinations, and an average message size.

2. The media of claim 1, wherein obtaining the message from the source further comprises obtaining two or more messages.

3. The media of claim 1, wherein the indication of the message destinations comprises a representation of one or more user selections of one or more graphic objects representing the message destinations for insertion into the template via the GUI.

4. The media of claim 1, further comprising automatically selecting the first programming block in response to determining that the message utilizes the first protocol, wherein the first programming block is automatically inserted into the template to populate the template and is displayed via the GUI, and wherein the first programming block comprises identifiers for labeling one or more structures in the message obtained from the source, the structure being defined by the first protocol.

5. The media of claim 1, further comprising automatically selecting the second programming block in response to determining that the second protocol is associated with one or more of the message destinations, wherein the second programming block is automatically inserted into the template to populate the template and is displayed via the GUI, wherein the second programming block comprises identifiers for labeling one or more structures defined by the first protocol, and one or more structures defined by the second protocol to replace the one or more structures defined by the first protocol.

6. The media of claim 1, further comprising generating a datafile that encodes the template that has been automatically populated.

7. One or more computer-readable storage media storing computer instructions thereon for execution by one or more processors to perform a method, the method comprising:

providing a template for message transformation, wherein providing the template causes the template to be displayed in a GUI;
obtaining a plurality of messages from a source;
determining that the plurality of messages utilizes a first protocol and a second protocol, the first protocol defining a structure of a first portion of the plurality of messages and the second protocol defining a different structure of a second portion of the plurality of messages;
obtaining an indication of one message destination via the GUI;
determining that the one message destination utilizes a third protocol, the third protocol defining a structure that is different from the first protocol and the second protocol;
automatically populating the template being displayed in the GUI for message transformation with a first programming block for the first protocol, a second programming block for the second protocol, and a third programming block for the third protocol in response to determining that the plurality of messages utilize the first protocol and the second protocol and determining that the one message destination utilizes the third protocol;
concurrently transforming the plurality of messages from the first protocol and the second protocol to the third protocol using the template comprising the first, second, and third programming blocks, wherein information encoded in the plurality of messages is conserved as encoded in the one transformed message using the third protocol;
communicating the one transformed message to the one message destination;
monitoring the plurality of messages received from the plurality of sources and the plurality of transformed messages communicated to the plurality of destinations; and
providing, via the GUI, a report on system performance that includes a total quantity of the plurality of messages received from the plurality of sources, a total quantity of the plurality of transformed messages communicated to the plurality of destinations, and an average message size.

8. One or more computer-readable storage media storing computer instructions thereon for execution by one or more processors to perform a method, the media comprising:
providing a template for message transformation, wherein providing the template causes the template to be displayed in a GUI;
receiving a plurality of messages from a plurality of sources;
obtaining one or more indications identifying a plurality of destinations, wherein the plurality of destinations utilize a plurality of distinct protocols relative to one another;
for one message that is received from one source, that uses one source protocol, and that is indicated to be sent to one destination that uses a destination protocol that is different from the source protocol:
automatically populating the template that is displayed in the GUI with an automatically selected programming block for the source protocol and another automatically selected programming block for the destination protocol; and
transforming the one message using the template that is populated;
for one message that is received from one source, that uses one source protocol, and that is indicated to be sent to at least two destinations using at least two destination protocols that are different from the one source protocol:
automatically populating the template that is displayed in the GUI with an automatically selected programming block for the one source protocol and another automatically selected programming block for each of the at least two destination protocols; and
transforming the one message using the template that is populated to generate at least two messages to communicate to the at least two destinations;
for two or more messages that are received from two or more sources, that use two or more source protocols, and that are indicated to be sent to only one destination using one destination protocol that is different from the two or more source protocols:
automatically populating the template that is displayed in the GUI with at least one automatically selected programming block for each of the two or more source protocols and another automatically selected programming block for the one destination protocol; and
transforming the two or more messages using the template that is populated to generate one message to communicate to the one destination;
communicating a plurality of transformed messages to the plurality of destinations;
monitoring the plurality of messages received from the plurality of sources and the plurality of transformed messages communicated to the plurality of destinations; and
providing, via the GUI, a report on system performance that includes a total quantity of the plurality of messages received from the plurality of sources, a total quantity of the plurality of transformed messages communicated to the plurality of destinations, and an average message size.

9. The method of claim 8, wherein the template is provided prior to obtaining the message from the source.

10. The method of claim 8, wherein further comprising: automatically selecting the template from a library of prebuilt templates, wherein the template is selected as linked to the first protocol.

11. The method of claim 8, wherein the one or more indications comprise a user-input selection of one or more graphic objects displayed in the GUI that represent the plurality of destinations.

12. The method of claim 8, wherein the automatically selected programming block for the source protocol is automatically displayed in the GUI as inserted into the template displayed, and wherein the automatically selected programming block includes one or more identifiers for labeling one or more structures of the plurality of messages.

13. The method of claim 8, wherein the automatically selected programming block for the destination protocol is automatically displayed in the GUI as inserted into the template displayed, and wherein the automatically selected programming block includes one or more identifiers for labeling one or more structures of the plurality of messages.

14. The method of claim 8, wherein the template for message transformation is prebuilt to define a transport level protocol and a security level protocol.

15. The method of claim 8, wherein a cloud-based application program interface (API) generates the GUI.

16. The method of claim 8, further comprising:
obtaining another indication of a user input selection via the GUI of an activation of another programming block displayed in the template, wherein the another programming block for which the activation obtained is activated for utilization in transforming one or more of the plurality of messages.

17. The method of claim 8, further comprising:
obtaining another indication of a user input selection via the GUI of a deactivation of another programming block displayed in the template, wherein the another programming block for which the deactivation obtained is omitted from the template.

\* \* \* \* \*